(12) United States Patent
Tin

(10) Patent No.: US 8,098,400 B2
(45) Date of Patent: Jan. 17, 2012

(54) GAMUT MAPPING IN SPECTRAL SPACE BASED ON AN OBJECTIVE FUNCTION

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/011,318

(22) Filed: Jan. 23, 2008

(65) Prior Publication Data

US 2009/0185200 A1 Jul. 23, 2009

(51) Int. Cl.
*G06F 15/00* (2006.01)

(52) U.S. Cl. ......... 358/1.9; 358/509; 358/518; 358/519; 358/523; 358/535; 382/162; 382/167; 345/589; 345/590; 345/600; 345/610

(58) Field of Classification Search .................. None
See application file for complete search history.

(56) References Cited

U.S. PATENT DOCUMENTS

| | | | | |
|---|---|---|---|---|
| 5,583,666 | A * | 12/1996 | Ellson et al. | 358/518 |
| 6,037,950 | A * | 3/2000 | Meir et al. | 345/427 |
| 6,587,793 | B2 | 7/2003 | Viassolo et al. | 702/27 |
| 6,698,860 | B2 | 3/2004 | Berns et al. | 347/15 |
| 6,798,904 | B2 * | 9/2004 | Borg | 382/167 |
| 6,850,342 | B2 | 2/2005 | Woolfe et al. | 358/1.9 |
| 6,920,244 | B2 | 7/2005 | Rosen et al. | 382/162 |
| 7,072,511 | B2 | 7/2006 | Tan et al. | 382/167 |
| 7,081,925 | B2 | 7/2006 | Yang et al. | 348/655 |
| 7,106,474 | B1 * | 9/2006 | Haikin et al. | 358/1.9 |
| 7,184,057 | B2 | 2/2007 | Stokes et al. | 345/600 |
| 2002/0122190 | A1 | 9/2002 | Harrington | 358/1.9 |
| 2002/0165684 | A1 | 11/2002 | Olson | 702/85 |
| 2002/0196972 | A1 | 12/2002 | Bayramoglu et al. | 382/167 |
| 2005/0069200 | A1 | 3/2005 | Speigle et al. | 382/162 |
| 2005/0254073 | A1 * | 11/2005 | Braun et al. | 358/1.9 |
| 2006/0250624 | A1 * | 11/2006 | Spaulding et al. | 358/1.9 |
| 2007/0046958 | A1 | 3/2007 | Hoof et al. | 358/1.9 |
| 2009/0141970 | A1 * | 6/2009 | Tin | 382/162 |
| 2009/0148040 | A1 * | 6/2009 | Tin | 382/167 |

OTHER PUBLICATIONS

Rosen et al., "Spectral Color Processing Using an Interim Connection Space", 2003, Proc. 11th CIC, pp. 187-192.*
The Color Management Company, "Color Inconstancy", Nov. 2000, HunterLab, vol. 12, No. 11, pp. 1-2.*

(Continued)

*Primary Examiner* — James A Thompson
*Assistant Examiner* — Miya J Cato
(74) *Attorney, Agent, or Firm* — Fitzpatrick, Cella, Harper & Scinto

(57) ABSTRACT

Mapping spectral colors in an Interim Connection Space (ICS) of a full spectral space based on an objective function is provided. A spectral color value in the ICS is accessed, and a spectral gamut boundary of the destination gamut is accessed. The spectral color value is mapped into mapped spectral color value based on minimization of an objective function of coordinates of a first subspace of the ICS, by fixing coordinates of a second subspace of the ICS, subject to a constraint that a result is within the spectral gamut boundary. The first subspace is a null space of a transformation from the ICS to a color space, while the second subspace is an orthogonal complement of the first subspace in the ICS. The constraint is determined by a gamut section that is an intersection of the spectral gamut in the ICS and an affine subspace characterized by the fixed coordinates of the second subspace.

20 Claims, 17 Drawing Sheets
(2 of 17 Drawing Sheet(s) Filed in Color)

OTHER PUBLICATIONS

Li, Changjun and Luo M Ronnier, Colour Constancy Based on Reflectance Functions, Proc. 14th Color Imaging Conference, pp. 175-179, 2006.

Tsutsumi, Shohei, Rosen, Mitchell R. and Berns, Roy S., Spectral Reproduction using LabPQR: Inverting the Fractional-Area-Coverage-to-Spectra Relationship, Proc. ICIS'06, pp. 107-110 (2006).

Rosen, et al., "Answering Hunt's Web Shopping Challenge: Spectral Color Management for a Virtual Swatch", Proc. of the IS&T/SID 9th Color Imaging Conference, pp. 267-272.

International Search Report and Written Opinion dated Mar. 10, 2009 in counterpart PCT/US2009/000390.

Rosen, et al. "Spectral Color Processing Using an Interim Connection Space", Proc. 11th CIC, pp. 187-192 (2003).

Derhak, et al., "Spectral Colorimetry Using LabPQR—An Interim Connection space". Proc. 12th CIC, pp. 246 (2004).

Tsutsumi, et al. "Spectral Color Management Using Interim Connection Spaces Based on Spectral Decomposition", Proc. 14th CIC, pp. 246-251 (2006).

Rosen, et al. "Spectral Gamuts and Spectral Gamut Mapping", SPIE IS&T vol. 6062.

Romney, et al., "Munsell Reflectance Spectra in 3-D Euclidean Space", Color Research & Application, vol. 128, No. 3, pp. 182-196, Jun. 2003.

Greenburg, "A Framework For Realistic Image Synthesis", Communications of the ACM, vol. 42, No. 8, pp. 45-53, Aug. 1999.

Wyszecki, et al., "Color Science: Concepts and Method, Quantitative Data and Formulae", 2nd Ed., Wiley, (1982).

ISO/TR 16066:2003(E), "Graphic Technology—Standard Object Color Spectra Database for Color Reproduction Evaluation" (SOCS), ISO (2003).

Johnson, et al., "Full-Spectral Color Calculations in Realistic Image Synthesis", IEEE Computer Graphics and Applications (1999).

U.S. Appl. No. 11/609,280, filed Dec. 11, 2006, entitled "Constructing Basis Functions Using Sensor Wavelength Dependence" by Siu-Kei Tin.

U.S. Appl. No. 11/954,184, filed Dec. 11, 2007, entitled "Spectral Gamut Mapping Based on a Colorimetric Gamut Mapping" by Siu-Kei Tin.

U.S. Appl. No. 11/947,741, filed Nov. 29, 2007, entitled "Generating an Interim Connection Space for Spectral Data" by Siu-Kei Tin.

U.S. Appl. No. 11/947,487, filed Nov. 30, 2007, entitled "Generating a Transformed Interim Connection Space for Spectral Data" by Siu-Kei Tin.

U.S. Appl. No. 11/948,977, filed Nov. 30, 2007, entitled "Generating a Device Independent Interim Connection Space for Spectral Data" by Siu-Kei Tin.

* cited by examiner

| FIG. 8A |
| FIG. 8B |

GAMUT MAPPING IN SPECTRAL SPACE BASED ON AN OBJECTIVE FUNCTION

BACKGROUND

1. Field of the Invention

This invention pertains to gamut mapping, and in particular, pertains to gamut mapping in spectral space based on an objective function.

2. Related Background Art

There is an increasing trend for color imaging applications to process and utilize spectral data, and/or to perform color processing in a spectral color space. For example, it has become common to characterize color devices such as scanners, cameras, printers and displays, in terms of their spectral responsivity, such as by obtaining a so-called spectral device profile. Once a spectral characterization of a device is obtained, operations such as transforming color data from a source device to a destination device, gamut mapping, etc., can be performed in the full spectral space.

As another example, some modern image capture devices can capture color image data in spectral or extended color spaces. In this regard, the use of spectral data such as spectral reflectance of objects and spectral power distribution of illuminants promises to yield even more advantages in the near future. Ultimately, one goal of spectral color reproduction is to produce color reproductions with remarkably high color fidelity, perhaps even matching the original scene on the spectral level. In the case of reflective objects, for example, a reproduction with a spectral match would have the same color as the original object under any illuminant.

On the other hand, other goals are possible. For example, instead of a spectral match, the goal may be to preserve the color appearance of an object under one illuminant even when it is viewed under a different illuminant. In other words, the goal may be to minimize color inconstancy under different illuminants. In fact, the human visual system has a built-in mechanism to achieve this: the associated phenomenon is known as "discounting the illuminant". However, when the new illuminant is drastically different from the original illuminant, the human visual system will detect the difference and the result is that the color of object "appears different" under the new illuminant. Notice that a spectral match would not preserve the color appearance under different illuminants, because even the original object would appear different under different illuminants. Preserving the color appearance so that it is resistant to change of illuminant could be an important objective for color critical business where a customer may purchase a commodity in a store under one light source only to find out that it looks significantly different under a different light source, for example, at home.

A spectral color management workflow can have very useful applications in everyday consumer products. For example, such technologies could allow online shoppers to print their own "virtual swatches" of fabrics, as detailed in the paper "Answering Hunt's Web Shopping Challenge: Spectral Color Management for a Virtual Swatch" by Rosen et al., Proceedings of the IS&T/SID $9^{th}$ Color Imaging Conference, pp. 267-272. Another application of spectral color management in computer aided design/computer aided manufacturing (CAD/CAM) applications allows manufacturers to visualize and demonstrate preliminary design ideas by simulation, before actually building a costly prototype.

While the use of spectral data can provide many advantages, such as reducing metamerism or minimizing color inconstancy, using spectral data presents some challenges in the context of gamut mapping. As in the colorimetric case where different devices have different colorimetric gamuts, in the spectral case, different devices have different spectral gamuts. Spectral color reproduction requires accommodating the difference in spectral gamuts. A standard approach to this problem in the calorimetric case is gamut mapping. Extending conventional, colorimetric gamut mapping algorithms to spectral gamut mapping algorithms however requires overcoming some difficulties. In particular, unlike conventional color spaces such as CIELAB and CIECAM02, there is no appearance attributes such as lightness or chroma to establish mapping direction. A basic question for spectral gamut mapping is how to design algorithms that do not require these appearance attributes.

Another difficulty comes from the high dimensionality of the spectral data. A known approach to this problem is the construction of Interim Connection Spaces (ICSs), which are of lower dimension than the full spectral space. Gamut mapping in ICSs instead of the full spectral space can alleviate some of the computational burden associated with high dimension, but the problem is still formidable without novel algorithms. This is because, although the dimension of the ICS is lower, it is nevertheless higher than three dimensions. Consequently, use of ICS in computationally intensive operations such as certain nonlinear optimization methods used in gamut mapping can be a major bottleneck in a spectral color management computational pipeline.

SUMMARY

To address the foregoing, the present invention provides for gamut mapping in spectral space based on an objective function.

In one example embodiment of the present invention, gamut mapping of source color data from a source gamut corresponding to a source device into a destination gamut corresponding to a destination device is provided. The gamut mapping uses an Interim Connection Space that comprises (1) a first subspace that is a null space of a first transformation comprising a transformation from the Interim Connection Space to a first color space based on a first illuminant, and (2) a second subspace that is an orthogonal complement of the first subspace. The method comprises accessing the source color data in the Interim Connection Space, accessing a spectral gamut boundary of the destination gamut in the Interim Connection Space, and mapping the source color data from the source gamut into the destination gamut. The mapping is based on minimization of an objective function of coordinates of the first subspace, by fixing coordinates of the second subspace in the Interim Connection Space, subject to a constraint that a result is within the spectral gamut boundary. The fixed coordinates of the second subspace correspond to a colorimetry of the source color data under the first transformation.

In one example aspect of the present invention, the objective function is based on an illuminant other than the first illuminant. For example, the objective function can be based on a color difference between two color values in the Interim Connection Space, the two color values corresponding to the source color data in the Interim Connection Space and a color value in the Interim Connection Space with the fixed coordinates of the second subspace, respectively. In a case of a plurality of illuminants other than the first illuminant, the objective function can be based on a sum of color differences, each color difference corresponding to one of a plurality of illuminants other than the first illuminant. In another example, the objective function can be based on a color inconstancy index, with respect to the first illuminant, of the source color data under the other illuminant. In a case of a plurality of other illuminants other than the first illuminant, the objective function can be based on a sum of color inconstancy indices, each color inconstancy index corresponding to one of a plurality of illuminants other than the first illuminant.

In another example embodiment, the spectral gamut is characterized by a convex hull, and mapping the source color data includes determining a gamut section of the spectral gamut at the fixed coordinates of the second subspace of the Interim Connection Space. The result of the mapping is constrained to within the gamut section.

In another example embodiment, constructing a computer-readable look-up table (LUT) comprises gamut mapping, as described above, each of a plurality of source color data to obtain a corresponding plurality of gamut-mapped data, and storing, in a computer-readable storage medium, the source color data and corresponding gamut-mapped data as a computer-readable LUT.

In yet another example embodiment of the present invention, a color management module comprises a LUT constructed as described above.

In another example embodiment, a device driver for a multi-channel printer comprises gamut mapping, as described above, source color data to obtain corresponding gamut-mapped data, and converting the gamut-mapped data to multi-channel data. In another aspect of the invention, the printer driver can include a LUT comprising gamut mapping and converting.

The invention may be embodied in a method, apparatus or computer-executable program code.

This brief summary has been provided so that the nature of the invention may be understood quickly. A more complete understanding of the invention can be obtained by reference to the following detailed description in connection with the attached drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION

Conventional color reproduction assumes fixed viewing conditions. In other words, the color accuracy of the reproduction can be guaranteed only if the reproduction is viewed under the same exact viewing conditions for which the reproduction was prepared, e.g., under $D_{50}$ illuminant. Needless to say, this assumption is not true in practice. For example, mail order catalogs are viewed by potential customers under a variety of viewing conditions, and it is unreasonable to mandate people to view them under $D_{50}$ illuminant, for example.

Fortunately, the human visual system has a built-in mechanism that attempts to preserve color constancy when the viewing conditions change. For example, if the illuminant is different from the one used in the reproduction, the colorimetry would of course be different, but the human visual system would attempt to apply a correction to the effect that the reproduction would look the same even though the illuminant has changed. This is called "discounting the illuminant". The adaptation mechanism of human vision has been modeled mathematically and is the subject of Color Appearance Models. The effect of illuminant is modeled by a chromatic adaptation transform, or CAT. The latest CAT endorsed by CIE is called CAT02.

Figure 12:
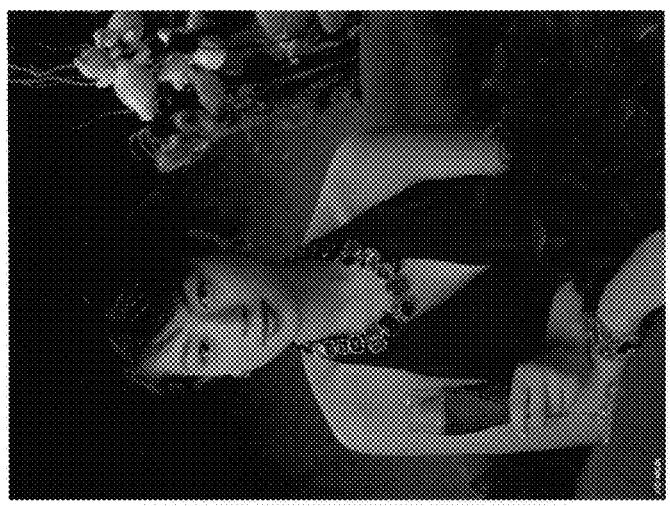
FIG. 12 is an example illustration simulating color inconstancy under multiple illuminants in printed images using conventional color reproduction.
Figure 12:
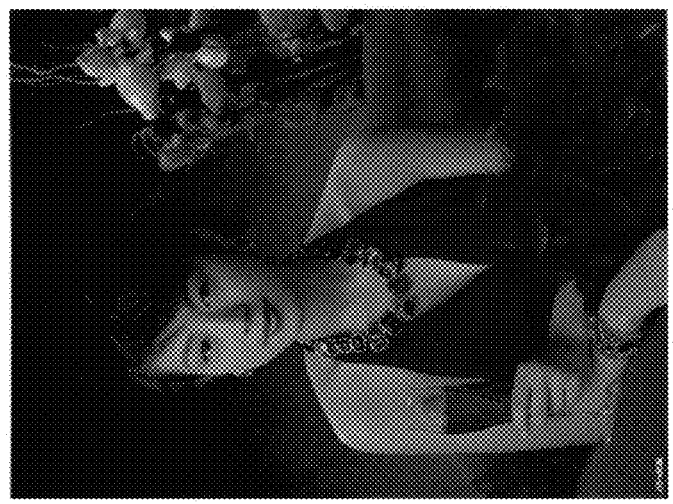
Figure 12:
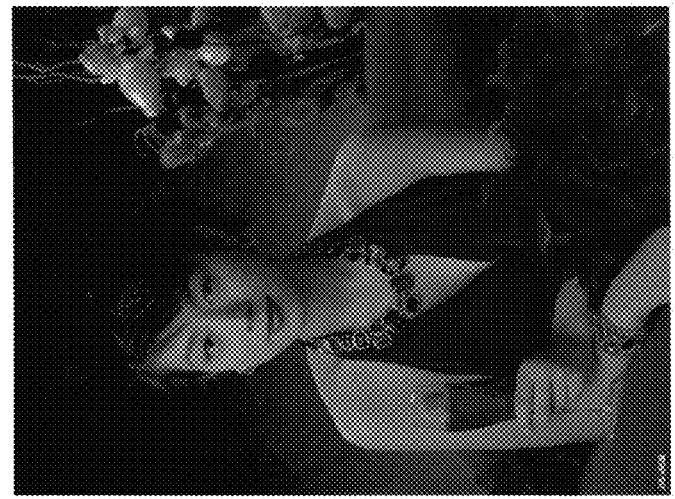

This mechanism is not perfect, however. If the illuminant is very different from the one used in the reproduction, then the human eye may "see" it differently. FIG. 12 provides an illustration of this effect by simulating how a print would look like under three illuminants, namely $D_{50}$, F4 and a typical high pressure sodium lamp. Print (a) of an image was made from a Canon i9900 inkjet printer using the default GDI driver, and a colorimetric gamut mapping has been applied by assuming that the illuminant is $D_{50}$. In other words, print (a) is meant to be viewed under $D_{50}$. Using CAT02, we simulate how the print would look like (to the human eye) under two other illuminants, F4 and high pressure sodium lamp. These two illuminants are significantly different from $D_{50}$; in particular, their color rendering indices are much lower than $D_{50}$. As a result, the human eye (again, modeled here by CAT02) is unable to make a perfect adjustment to make them look exactly like $D_{50}$. As can be seen from the simulation, under F4 and high pressure sodium lamp (prints (b) and (c), respectively), the image is evidently deficient in the red colors, and this manifests particularly as pale flesh tone.

Within the framework of colorimetric reproduction, there is nothing one can do to improve the above situation. By its very definition, a colorimetric gamut mapping algorithm (GMA) operates completely within a colorimetry-based color space such as CIELAB or CIECAM space. No matter how the GMA is improved, it will only guarantee a certain result under the fixed viewing conditions that correspond to the CIELAB or CIECAM space. However, the look of the print under other illuminants can be improved while preserving the look under $D_{50}$ by tapping into "hidden dimensions" beyond the calorimetric ones, such as the spectral dimensions.

With multi-ink printers having a spectral gamut of dimension higher than three, there are many possible ink combinations that would give the same XYZ under $D_{50}$. By carefully choosing the right ink combinations, for example, by using one of the methods of gamut mapping according to the present invention, it becomes possible to achieve the same colorimetry under $D_{50}$ while reducing color inconstancy as the illuminant changes. In many cases, color inconstancy can be minimized even if the illuminant changes drastically, such as from $D_{50}$ to a highly dissimilar one such as F4 or high pressure sodium lamp.

Figure 1:
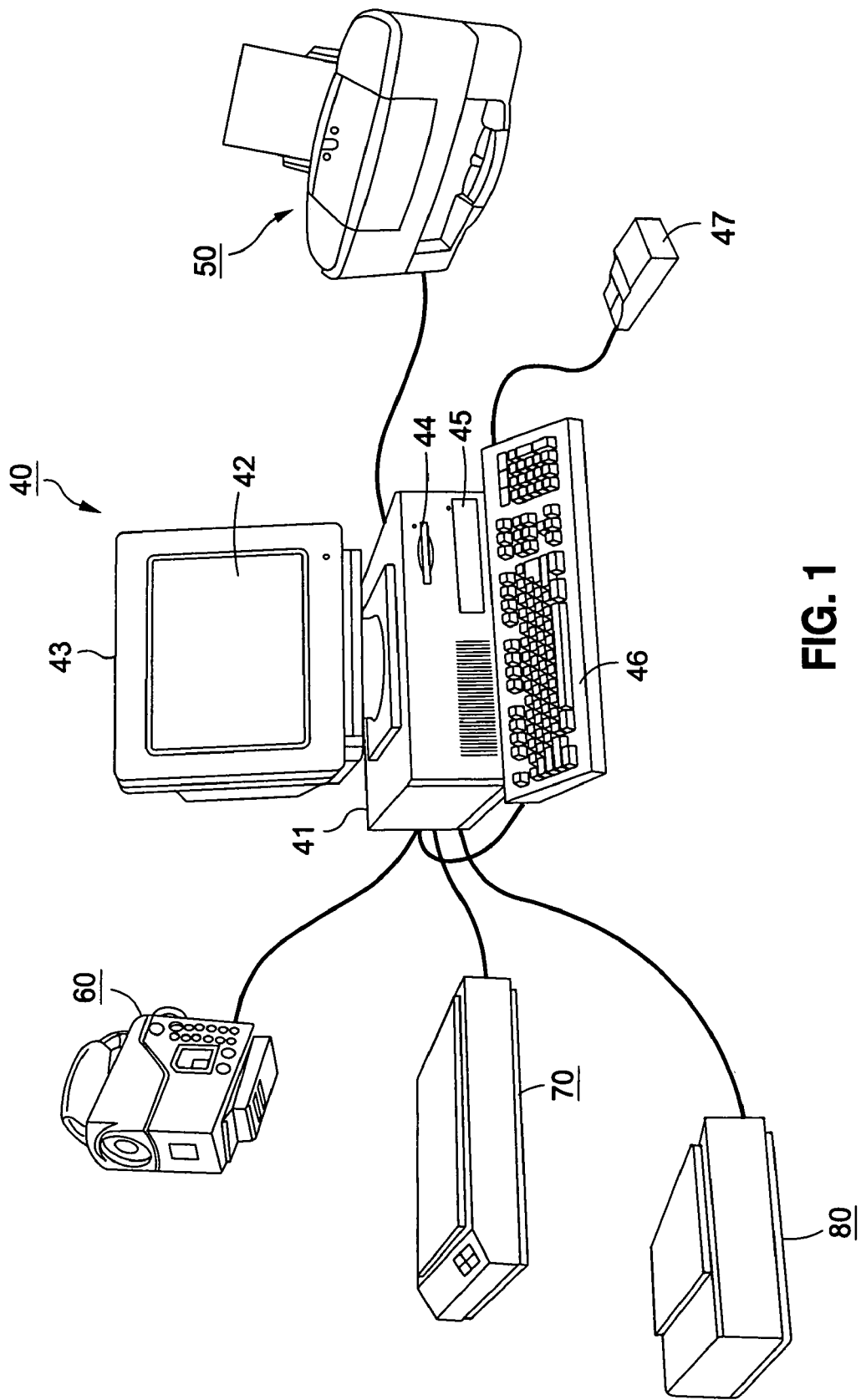
FIG. 1 is a perspective view of an exemplary computing environment in which the present invention may be implemented.

In this regard, FIG. 1 is a perspective view of a representative computing system including a data processing system 40, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a multi-ink output printer, such as a color bubble jet printer, which forms color images on a recording medium such as paper or transparencies or the like. In addition, digital color scanner 70 is provided for scanning documents and images into data processing system 40 and multi-spectral camera 60 is provided for sending digital images to data processing system 40. Of course, data processing system 40 may acquire digital image data from other sources such as a digital video camera, a server on a local area network, the Internet, etc. (not shown). A spectrophotometer 80 may be provided for measuring the spectral reflectance of a color sample, and sending the spectral data to data processing system 40.

Figure 2:
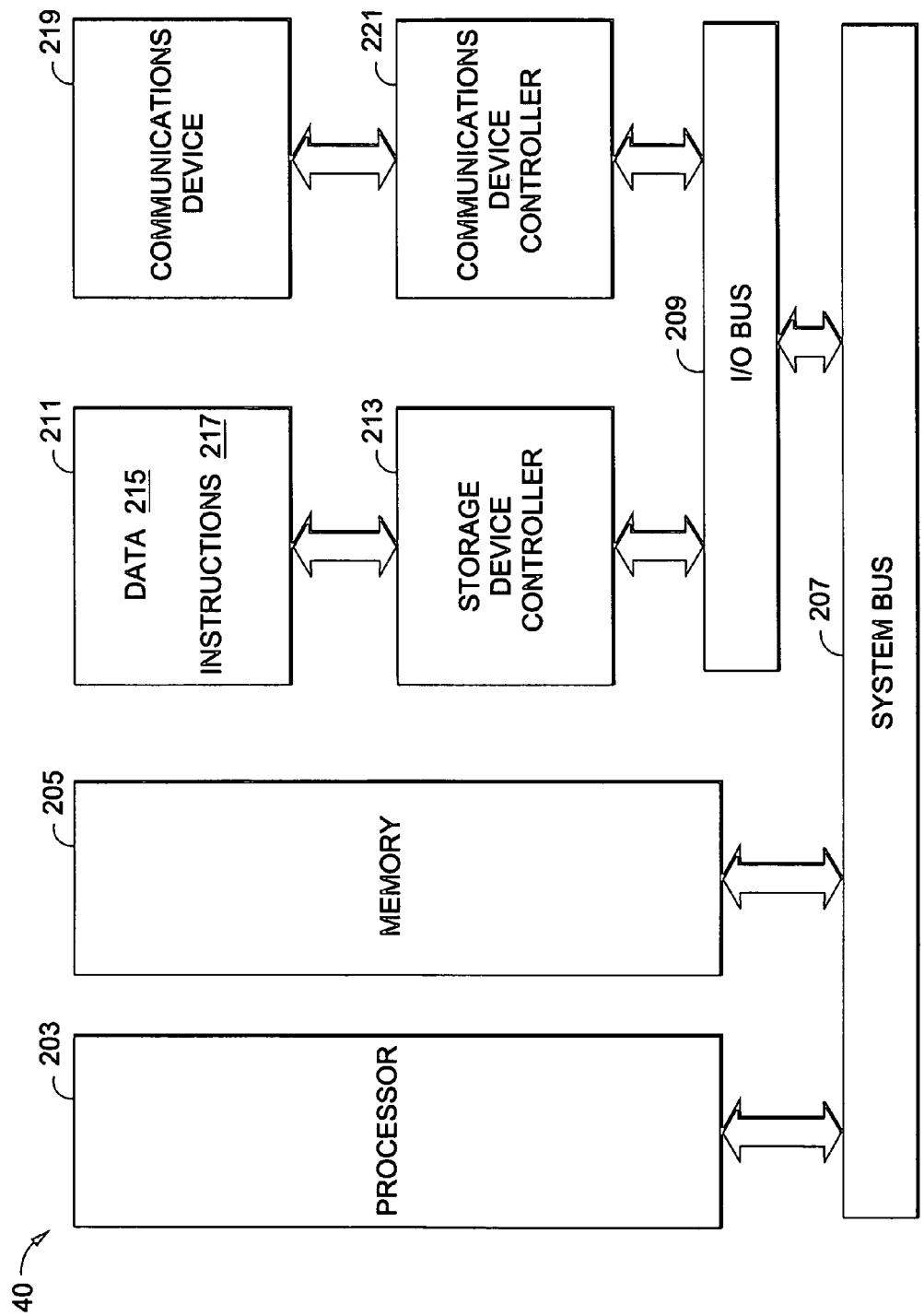
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of the present invention, as described in more detail below.

Figure 3:
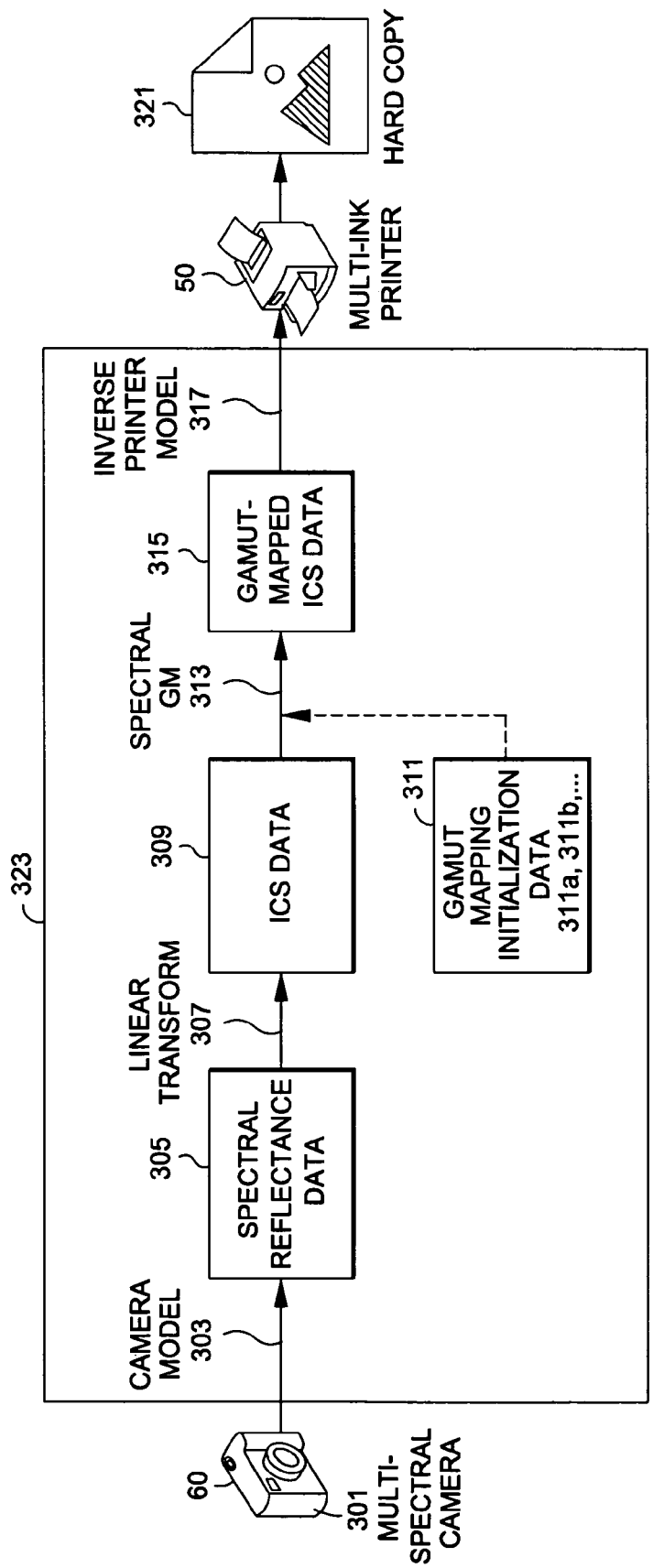
FIG. 3 is a representational diagram of an example workflow in which methods according to the present invention can be implemented.

FIG. 3 shows a representational diagram of an example workflow in which methods according to the present invention can be implemented. In particular, FIG. 3 shows an example printer workflow utilizing a spectral gamut mapping generated by methods of the present invention.

In the present example workflow of FIG. 3, source image data 301 from a source multi-spectral device, such as a multi-spectral camera 60, is converted into spectral reflectance data 305 using a device transform, such as a camera model 303. Spectral reflectance data 305 is transformed into ICS data 309 using a linear transform 307 provided by the ICS. A spectral gamut-mapping 313, such as one generated by methods of the present invention, is initialized using the gamut mapping initialization data 311 and performed on ICS data 309 to obtain gamut-mapped ICS data 315. The gamut mapping initialization data 311 can include, for example, spectral gamut boundary data 311a of the destination device, and illuminant data 311b (which can include data on a reference illuminant and data on other illuminants). An inverse printer model 317 is applied to gamut-mapped ICS data 315, and the resulting data is sent to a multi-ink output printer 50, for example, which produces a hard copy 321 of image data 301.

Elements 303 to 317 of FIG. 3 define a color management module (CMM) 323, which can be implemented, for example, as part of program instructions 217 executed by data processing system 40 of FIG. 2.

A method of gamut mapping according to one example embodiment of the present invention will now be described with reference to FIG. 4. This example embodiment utilizes the notion of a "constrained" Interim Connection Space (ICS). Therefore, a brief summary of constrained ICSs will first be provided.

In general, an ICS CW is specified by its relationship to the full N-dimensional spectral space, S (where N is typically a number 31 or higher). More precisely, this means there are two linear transformations P: S→CW and Q: CW→S. Now suppose there is a full-rank linear transformation Γ: S→X from the full spectral space S to a color space X. A constrained ICS (relative to the map Γ) has the additional property that the space can be decomposed into an orthogonal sum of two subspaces C and B, written CW=C⊕B. FIG. 12 depicts an illustration of an example constrained ICS composed of a two-dimensional subspace C and a one-dimensional subspace B. The subspace B is the null space of the composite transformation ΓQ. The subspace C can be identified with the color space X via a linear transformation. In other words, C is linearly isomorphic to X.

Constrained ICSs are described in more detail below in the section entitled "Constrained ICS", which includes one example method of constructing a constrained ICS from an original ICS. It is however noted that if the original ICS already possesses the additional properties, no further construction is necessary. In particular, the example embodiment of the present invention does not require or involve the construction of a constrained ICS from an original ICS.

Figure 4:
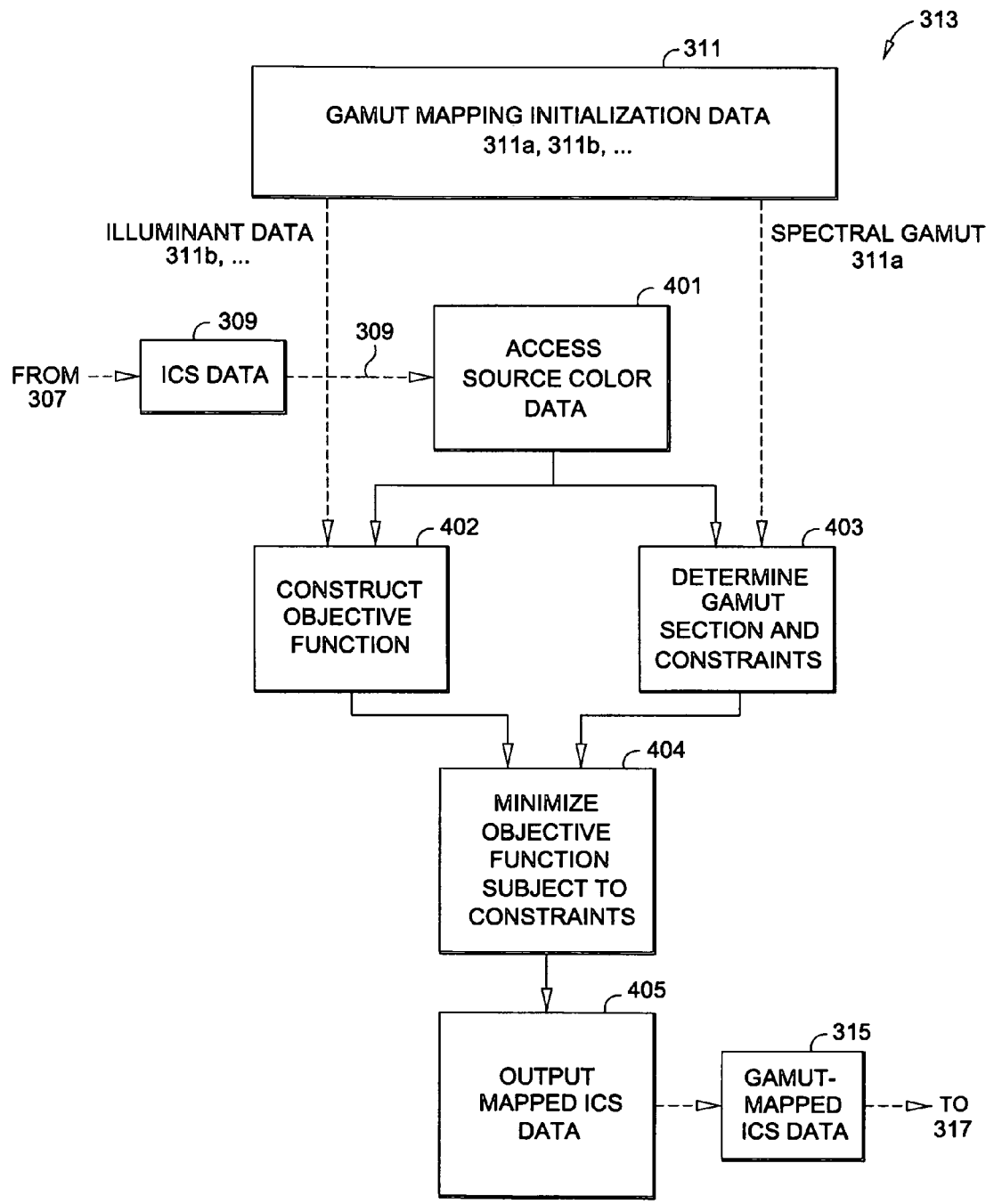
FIG. 4 is a process flowchart of a method of gamut mapping according to one example embodiment of the present invention.

Referring now to FIG. 4, one method of gamut mapping according to the present example embodiment will now be described. In the present example embodiment, the method is implemented as part of CMM 323. Source color data 309 in a constrained ICS is accessed (401). In this regard, the source color data is in a source device gamut in the ICS prior to being accessed. An objective function is constructed (402) from the illuminant data (311*b*) and the source color data 309. At the same time, the constraints for the optimization problem are determined (403) from the spectral gamut 311*a* and the source color data 309. The objective function is minimized (404) subject to the constraints determined at 403. Using the optimization result, the mapped ICS data is determined and outputted (405).

The construction (402) of the objective function will now be described. The objective function in the most general form is simply a real-valued function from CW to R, the real numbers. Formulating the objective function in such general form is however not practical because optimization with so many parameters (the number of which is equal to the dimension of CW, typically 5 or higher for multi-ink printers) is computationally very demanding, not to mention there would be constraints on these parameters in the optimization that add to the computational complexity. However, by using a constrained ICS, the number of parameters in an objective function can be reduced by limiting it to a gamut section.

In the constrained ICS CW, a point is denoted by coordinates c and b, and the point itself by $c \oplus b$. In the present example embodiment, the constraining map $\Gamma$ for CW is the integration map from the space of spectra to XYZ under a reference illuminant $I_{ref}$. For example, $I_{ref}$ can be $D_{50}$. From the additional requirements of a constrained ICS, the coordinate c can be identified as an XYZ under $I_{ref}$. If c is fixed at $c_0$, for example, then $c_0 \oplus b$ would have the same colorimetry under $I_{ref}$ for any b. By fixing $c = c_0$, the objective function of the present embodiment is a function of b instead of the entire space CW. For example, if the dimension of CW is 5, then the space C of coordinates c has dimension 3, and the space B of coordinates b has dimension 2. Instead of having an objective function with 5 parameters, this approach uses an objective function with only 2 parameters. The computational advantage is clear. It also has the benefit that this objective function has the constraint that the colorimetry is fixed at $c_0$ built right in. Note that we would still have constraints resulting from the spectral gamut, to be discussed later.

Some example objective functions will now be described. In a first example objective function, a set of illuminants $I_1, \ldots, I_N$ of interest has been identified. These are the "other illuminants". For a given spectrum specified by a full point $x_{in}$ in CW, and a point $c_0$ that lies within the calorimetric gamut in the subspace C, the objective function is defined as the sum of color differences of $x_{in}$ and $c_0 \oplus b$ under the illuminants $I_1, \ldots, I_N$. In other words, an objective function $F_{\Delta E}$ is constructed as:

$$F_{\Delta E}(b; x_{in}, c_0) = \sum_{n=1}^{N} \Delta E(x_{in}, c_0 \oplus b; I_n)$$

where $\Delta E(x_1, x_2; I)$ denotes a color difference calculation between the two XYZs corresponding to the spectra $x_1$, $x_2$ under the illuminant I. For example, the color difference can be CIEDE94 or CIEDE2000. This objective function searches for the point on the section $c = c_0$ that is closest to the input spectrum $x_{in}$ under the illuminants $I_1, \ldots, I_N$. A natural choice for $c_0$ is the point inside the colorimetric gamut that is closest to $x_{in}$ in colorimetry under the reference illuminant $I_{ref}$, but other choices resulting from other colorimetric gamut mapping techniques are possible.

In a second example objective function, a set of illuminants $I_1, \ldots, I_N$ of interest has been identified. These are the "other illuminants". For a given point $c_0$ in the subspace C, the objective function is defined as sum of color inconstancy indices under the illuminants $I_1, \ldots, I_N$. In other words, an objective function $F_{CON}$ is constructed as:

$$F_{CON}(b; c_0) = \sum_{n=1}^{N} \Delta E_{ref}(XYZ(c_0 \oplus b, I_{ref}), CAT(XYZ(c_0, \oplus b, I_n), I_n, I_{ref}))$$

where $\Delta E_{ref}(XYZ_1, XYZ_2)$ denotes a color difference calculation between $XYZ_1$ and $XYZ_2$ under the reference illuminant $I_{ref}$, $XYZ(x, I)$ denotes the XYZ of the spectrum x under the illuminant I, and $CAT(XYZ, I, I_{ref})$ denotes the "corresponding" XYZ after adapting from illuminant I to $I_{ref}$ using a color adaptation transform. The color adaptation transform used can for instance be CIECAT02. This objective function searches for the point on the section $c = c_0$ that would give the same appearance as the reference illuminant under each of the illuminants in $I_1, \ldots, I_N$. The choice of $c_0$ may depend on the input color data. If the input color data are ICS data, say $x_{in}$, then $c_0$ could be the point inside the calorimetric gamut that is closest to $x_{in}$ in colorimetry under the reference illuminant $I_{ref}$. On the other hand, if the input color data are colorimetric data under illuminant $I_{ref}$, then $c_0$ could be simply the input point, or, if the input point is outside the calorimetric gamut, the point obtained after applying a calorimetric gamut mapping to the input point.

Figure 13:
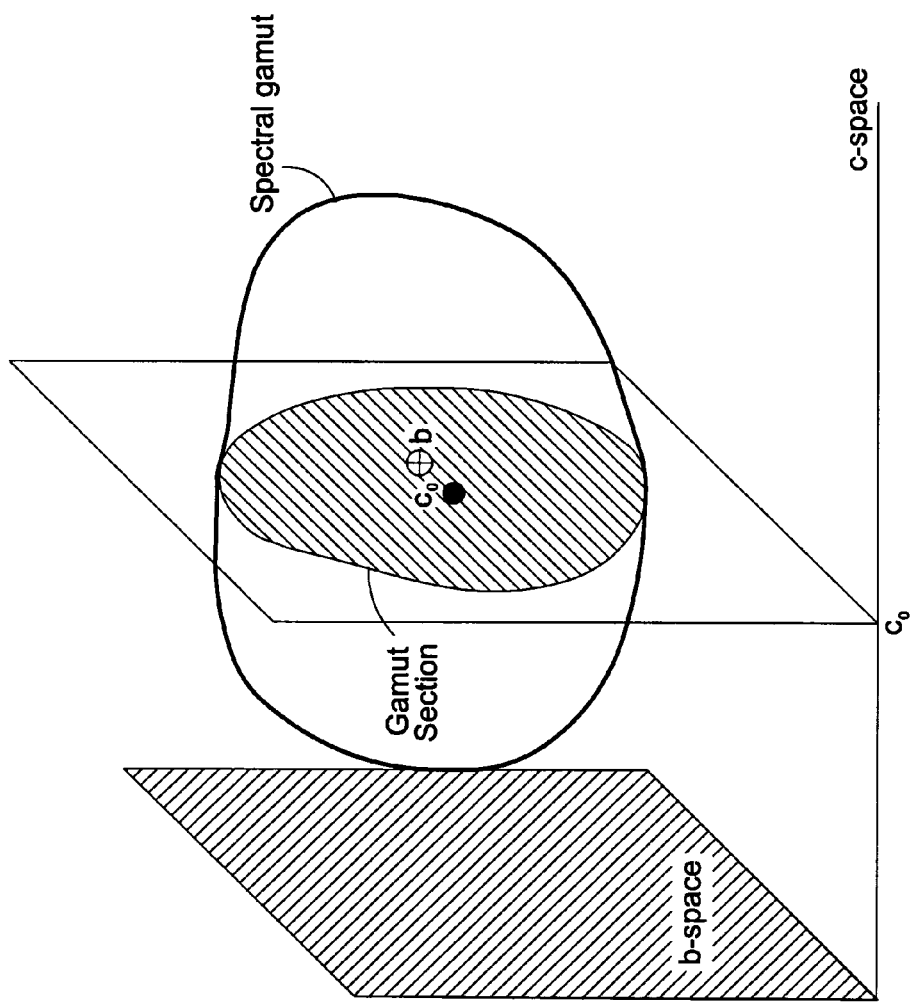
FIG. 13 is a representational diagram of a spectral gamut intersected with an affine plane to determine a gamut section.

The process of determining (403) gamut section and constraints involves determining a gamut section of the spectral gamut boundary at $c_0$. Since a spectral gamut has already been constructed in the ICS CW, a gamut section is the intersection of the spectral gamut with the b-plane that passes through $c_0$, see FIG. 13.

While this description is simple enough, it is computationally demanding to compute this gamut section, especially when the dimension of ICS is high. In one preferred embodiment, a convex hull is used to model the spectral gamut, and an elaborate computational device, described in more detail below in the section "Facet Sectioning", is used to calculate the vertices of the gamut section. Because the spectral gamut is convex, so is the gamut section. Knowledge of the vertices of the gamut section then allows a convex hull calculation to be made such that the bounding hyperplanes of the convex gamut section can be determined. These hyperplanes can be completely specified by a set of M (say) linear inequalities in the b-space, of the form:

$$Lb \geq k$$

where L is an M×n−3 matrix, while k is a column vector of dimension M.

Next, the following minimization problem is solved (404):
Minimize F(b),
subject to the constraints $Lb \geq k$
Finally, the mapped ICS data are outputted (405) as $c_0 \oplus b^*$, where $b^*$ is the optimal solution of the above nonlinear optimization problem.

For example, if the objective function $F_{\Delta E}$ above is used, then the solution to the minimization problem gives a spectrum that is (1) inside the spectral gamut, (2) has the desired colorimetry, i.e., $c_0$, under the reference illuminant, and (3)

smallest total color difference from the input spectrum $x_{in}$ under the specified set of illuminants.

On the other hand, if the objective function $F_{CON}$ above is used, then the solution to the minimization problem gives a spectrum that is (1) inside the spectral gamut, (2) has the desired colorimetry, i.e., $c_0$, under the reference illuminant, and (3) smallest total color inconstancy index under the specified set of illuminants.

Figure 14:
FIG. 14 is an example illustration simulating improved color constancy under multiple illuminants.
Figure 14:
Figure 14:
Figure 14:
Figure 14:

FIG. 14 shows the result of the gamut mapping obtained from the objective function $F_{CON}$. The reference illuminant is $D_{50}$, and two illuminants (N=2) are used to define the color inconstancy indices, namely illuminant F4 and a typical high pressure sodium lamp. The $c_0$ comes from the colorimetric gamut mapping that results in the reference image labeled (a), i.e., for each pixel, we try to match the look of $D_{50}$ colorimetry specified by $c_0$. Essentially, we are trying to create a spectral specification of the output such that (1) under $D_{50}$ it is exactly what would be given by the classical colorimetric intent, (2) under illuminant F4 or high pressure sodium lamp, the output looks as close as possible to the look under $D_{50}$ when a human looks at it. FIG. 14 is a simulation (on the screen) of what the output would look like under $D_{50}$, F4 and high pressure sodium lamp, using CAT02 to chromatically adapt the respective illuminant to $D_{65}$ sRGB monitor. For comparison, the simulated outputs from the GDI printer driver in FIG. 12 (labeled (b) and (c) respectively) are shown again to demonstrate the advantage of the new gamut mapping algorithm.

Figure 15:
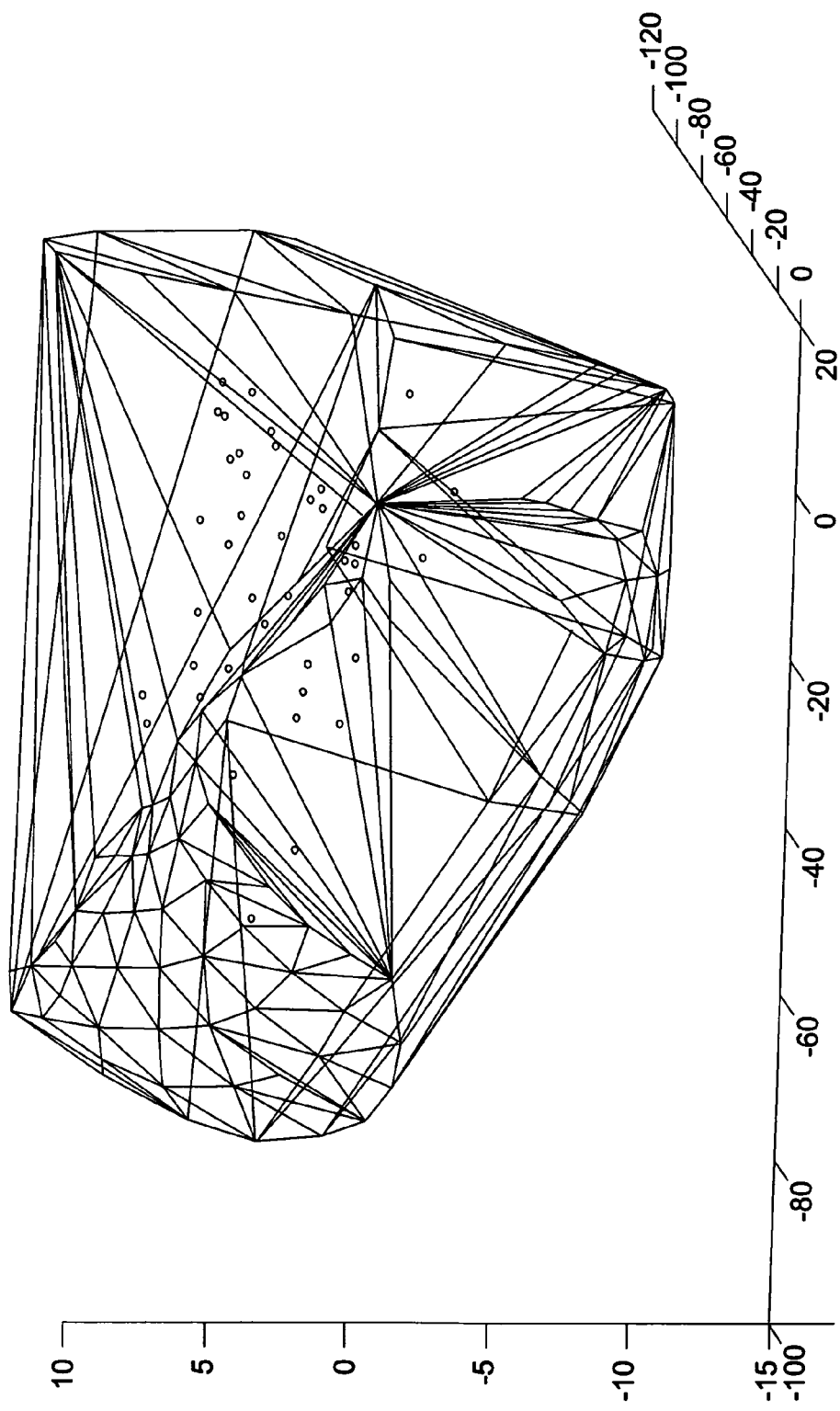
FIG. 15 illustrates results of a gamut-mapping using one example objective function.
Figure 16:
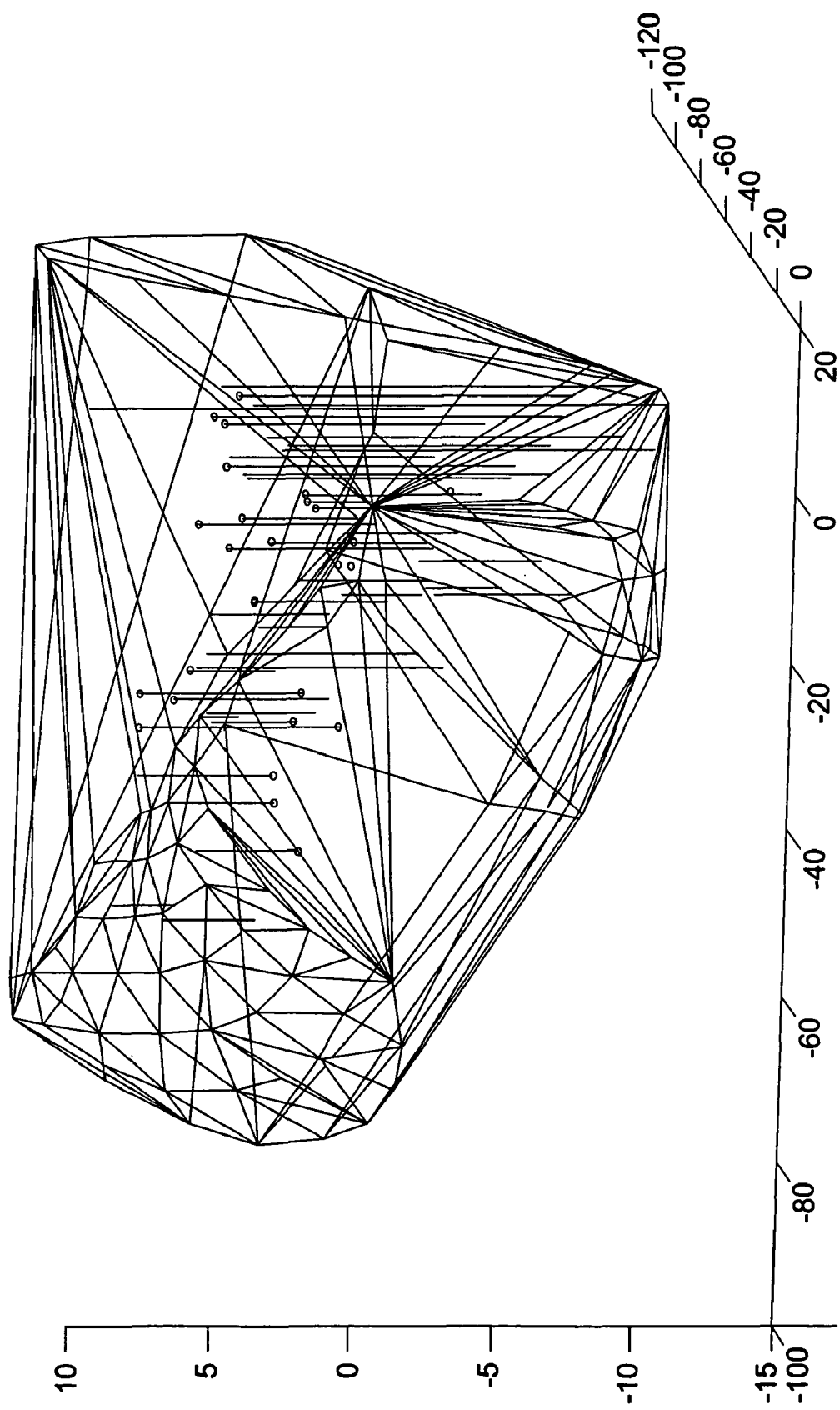
FIG. 16 illustrates results of a gamut-mapping using another example objective function.

The objective function $F_{CON}$ also presents an instance of a spectral gamut mapping that changes the input spectrum even if the input spectrum is inside the spectral gamut. In FIG. 15, a 5-dimensional spectral gamut is depicted in 3D by projecting onto the $c_1 c_2 b_1$-subspace of a constrained ICS. The input spectra are represented by circles while the output spectra after the gamut mapping by crosses. Only input spectra that are already inside the spectral gamut are shown in the figure, and it can be seen that they remain fixed after the gamut mapping resulting from the objective function $F_{\Delta E}$. The same is not true for gamut mapping resulting from the objective function $F_{CON}$, as can be seen in FIG. 16.

It should be clear that the application to $F_{CON}$ has direct relevance even in conventional calorimetric, i.e. non-spectral, reproduction. This has been indicated above in the discussion of the choice of $c_0$ when the input color data are calorimetric data instead of ICS data. In such application, the gamut mapping is typically combined in an interpolation LUT that models the end-to-end transform from source device to destination device. This LUT in turn could reside in two possible locations in the printing workflow: It could be in an ICC profile, for instance, in which case the printer driver would need to be able to accept multi-channel input data coming out of the ICC profile. The other possibility is for a GDI printer driver (which takes RGB as input) to have an internal LUT that converts RGB to multi-channel data by converting RGB data to colorimetric data, then applying the gamut mapping described in the example embodiment, and finally converting the mapped ICS data to multi-channel data. Further image processing such as dithering can follow afterwards. The new gamut mapping described in the example embodiment would have significant advantage over existing ink separation algorithm typically implemented in the default GDI driver, in terms of color constancy with respect to change in illuminant. Furthermore, when this new gamut mapping algorithm is implemented in the device driver, in addition to the linear constraints imposed by the gamut boundary as discussed above, it is possible to impose further constraints to achieve other objectives such as ink limiting, which are typically done in the driver too.

Facet Sectioning

One method of facet sectioning according to an example embodiment will now be described with reference to FIGS. 5 and 6. This method is one method that can be used in calculating a gamut section, such as the calculation of the gamut section at 403 of FIG. 4. Suppose the dimension of the ICS is n, and dimension of the convex spectral gamut $\bar{H}$ is also n. In particular, the boundary of the spectral gamut $\bar{H}$ consists of (n−1)-dimensional simplices, or facets. The boundary of the gamut section is therefore the collection of sections of the facets.

Figure 5:
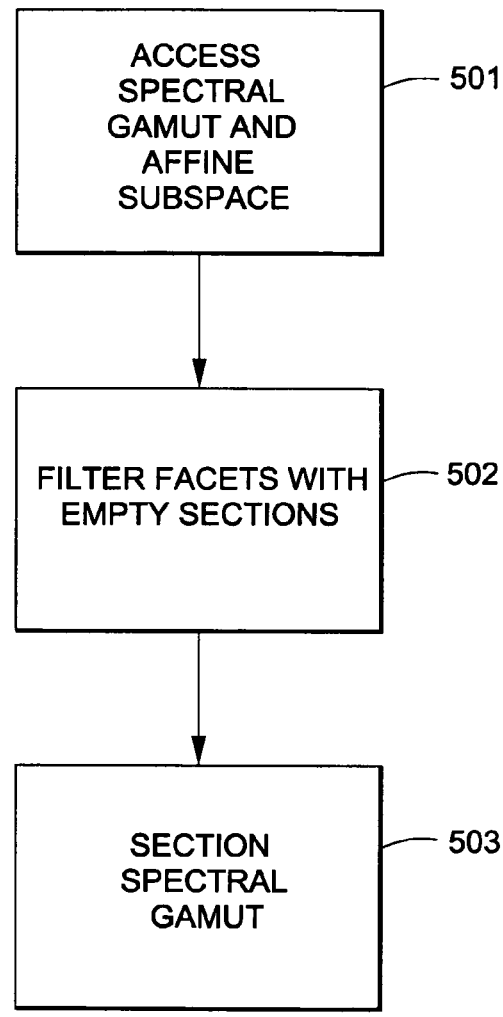
FIG. 5 is a process flowchart of a method of facet sectioning according to one example embodiment of the present invention.

FIG. 5 shows an overview of a facet sectioning method that includes an optimization to avoid unnecessary calculations involving facets having empty sections. In particular, the spectral gamut $\bar{H}$ and the affine subspace defined by $c=c_0$ are accessed (501). The facets that would definitely have an empty section are determined using a set of preliminary conditions and filtered in the calculation of the gamut section boundary (502). The following conditions are used in the determination. Namely, suppose $c_0=(c_1,c_2,c_3)$ and a facet is defined by vertices $p_0, p_1, \ldots, p_{n-1}$. If the projections of $p_0, p_1, \ldots, p_{n-1}$ onto the $c_1$-axis are all bounded away from $c_1$, i.e., one of the following conditions is satisfied:

$$\max_{i=0,\ldots,n-1}(1st \text{ projection of } p_i) < c_1$$

or $$\min_{i=0,\ldots,n-1}(1st \text{ projection of } p_i) > c_1$$

then this facet will have empty section with the affine space at $c=c_0$. Projections onto the $c_2$-axis and the $c_3$-axis each have a corresponding set of two conditions. These conditions are computationally inexpensive to check, and by filtering out facets using these conditions, the calculation of the boundary of the gamut section can be sped up.

The spectral gamut $\bar{H}$ is sectioned (503). This is done by intersecting the affine subspace at $c=c_0$ with each of the facets that have not been filtered in the preliminary step. In particular, each boundary facet of the convex hull of spectral gamut $\bar{H}$ is a m-dimensional simplex sitting in the n-dimensional ICS CW, where m=n−1. Denoting the vertices of the simplex by $p_0, p_1, \ldots, p_m$, any point x in the simplex can be described by the equations:

$$x = p_0 + t_1 v_1 + t_2 v_2 + \ldots + t_m v_m$$

$$v_1 = p_1 - p_0, v_2 = p_2 - p_0, \ldots, v_m = p_m - p_0$$

$$t_1, \ldots, t_m \geq 0, t_1 + t_2 + \ldots + t_m \leq 1$$

"Sectioning" refers to the operation of intersecting this simplex with a dimension (n−3), or codimension 3, affine subspace, defined by the equations $$x_1 = c_1$$

$$x_2 = c_2$$

$$x_3 = c_3$$

Generally, the intersection will be a convex set (but not necessarily a simplex) of dimension m−3=n−4.

In principle, the above problem can be addressed by solving a set of linear equations. However, solving the set of linear equations (which may include checking the solution against the inequalities) for each facet can potentially lead to problems. For example, the number of facets grows exponentially with n. To illustrate this, a calculation of the gamut hull in ICSs of various dimensions was performed for a Canon i9900 inkjet printer, and the following data were obtained:

|        | n     |       |        |         |
|--------|-------|-------|--------|---------|
|        | 5     | 6     | 7      | 8       |
| #Facets | 10244 | 58882 | 316630 | 2803365 |

As n increases, the large number of facets involved can proscribe the use of many typical routines for solving the linear equations. Solving the linear equations entails a transformation of the parameters $t_1, t_2, \ldots, t_m$ to new parameters so that the new system of equations is easier to solve. In particular, because the intersection is expected to be of dimension m−3, there should be m−3 "free" parameters after the transformation. In one method, solving the linear equations entails performing a linear transformation from the parameters $t_1, t_2, \ldots, t_m$ to new parameters $s_1, s_2, \ldots, s_m$, part of which will form the "free" parameters. It is noted that a large part of this transformation can be pre-computed for each facet, independently of $c_1, c_2, c_3$. This pre-computation could be particularly beneficial when gamut mapping a lot of colors, as is typically done when building an interpolation lookup table (LUT).

Using matrix notation, the above equations can be written as:

$$t = \begin{pmatrix} t_1 \\ t_2 \\ \vdots \\ t_m \end{pmatrix}, A = \begin{pmatrix} v_1 & v_2 & \ldots & v_m \end{pmatrix}$$

$$x = p_0 + At$$

A 3×m matrix $\tilde{A}$ is obtained by taking the first three rows of A. Recall that the first three coordinates of the space C W correspond to the C subspace. SVD is performed on $\tilde{A}$, resulting in the following decomposition:

$$\tilde{A} = UDV^T$$

where U is a 3×3 orthogonal matrix, D is a 3×m "diagonal" matrix of the form:

$$D = \begin{pmatrix} d_1 & 0 & \ldots & \ldots & \ldots & 0 \\ 0 & d_2 & 0 & \ldots & \ldots & 0 \\ 0 & 0 & d_3 & 0 & \ldots & 0 \end{pmatrix}$$

with $d_1 \geq d_2 \geq d_3$, and V is an m×m orthogonal matrix. If the simplex is in "general position", then $d_3 > 0$, meaning that the projection of the simplex onto the C subspace is a 3-dimensional simplex. Now define the coordinate transformation:

$$t = Vs, s = \begin{pmatrix} s_1 \\ s_2 \\ \vdots \\ s_m \end{pmatrix}$$

Under this transformation, it can be shown from the SVD that only $s_1, s_2, s_3$ are needed to determine $x_1, x_2, x_3$. In other words, $s_4, \ldots, s_m$ are "free" parameters. Splitting the first three rows/columns of the matrices, the following partitioning is obtained:

$$A = \begin{pmatrix} \tilde{A} \\ \ldots \\ \hat{A} \end{pmatrix}, x = \begin{pmatrix} \tilde{x} \\ \ldots \\ \hat{x} \end{pmatrix}, p_0 = \begin{pmatrix} \tilde{p}_0 \\ \ldots \\ \hat{p}_0 \end{pmatrix}, V = \begin{pmatrix} \tilde{V} & \vdots & \hat{V} \end{pmatrix}, s = \begin{pmatrix} \tilde{s} \\ \ldots \\ \hat{s} \end{pmatrix}$$

$$\tilde{x} = \tilde{p}_0 + \tilde{A}\tilde{V}\tilde{s} + \tilde{A}\hat{V}\hat{s} = p_0 + \tilde{A}\tilde{V}\tilde{s}$$

$$\hat{x} = \hat{p}_0 + \hat{A}\tilde{V}\tilde{s} + \hat{A}\hat{V}\hat{s}$$

It is noted that in the above, $\tilde{A}\hat{V}\hat{s} = 0$ because of the zeroes in D. From this, it follows that for each facet, the following can be pre-computed for reuse for different input spectra:

$B = \tilde{A}\tilde{V}$ (3×3 matrix) and its inverse $B^{-1}$, $C = \hat{A}\hat{V}$ (n−3×m−3 matrix), and if $n \geq 6$, its Moore-Penrose inverse $C^+$, and $H = \hat{A}\tilde{V}$.

Note that B is invertible because of the assumption that $d_3 > 0$. The pseudo-inverse $C^+$ is used in the calculation of the closest point of the simplex section from a given point. For $n \leq 5$, the simplex section is either a point or a line segment, and a direct calculation will be used instead.

With these pre-computed quantities, solving the equations $\tilde{x} = c = (c_1, c_2, c_3)^T$ for each facet involves the following steps.

First, the constrained parameters are computed via the equation $\tilde{s} = B^{-1}(c - \tilde{p}_0)$. This is followed by the computation of the new "origin" in the n−3 dimensional $\hat{x}$-space via the equation $q_0 = \hat{p}_0 + H\tilde{s}$. The m−3 free parameters $\hat{s}$ parameterize an affine subspace inside the n−3 dimensional $\hat{x}$-space by the following equation:

$$\hat{x} = q_0 + C\hat{s}$$

However, because the simplex is defined by a set of inequalities, $\hat{s}$ is not completely free, but is also constrained by similar inequalities. Using the equation $t = Vs$ and writing $V = (V_{ij})$, these inequalities are:

$$\sum_{j=4}^{m} V_{1j} s_j + k_1 \geq 0$$

$$\vdots$$

$$\sum_{j=4}^{m} V_{mj} s_j + k_m \geq 0$$

$$\sum_{i=1}^{m} \sum_{j=4}^{m} V_{ij} s_j + k_0 \leq 1$$

where the constants are defined by $$k_1 = V_{11} s_1 + V_{12} s_2 + V_{13} s_3$$

$$\vdots$$

$$k_m = V_{m1} s_1 + V_{m2} s_2 + V_{m3} s_3$$

$$k_0 = \sum_{i=1}^{m} \sum_{j=1}^{3} V_{ij} s_j$$

These inequalities define a convex set in $\hat{s}$-space, which in turn defines a convex set in $\hat{x}$-space via the above parameterization.

To sum up, through a series of linear transformations that can be pre-computed for each facet, computation of a facet section is reduced to the problem of computing a convex set in the m−3 dimensional ŝ-space defined by the above inequalities. Example embodiment of this computation for the first two low dimensions n, n=5 (m=4) and n=6 (m=5) will be described next.

The n=5 (m=4) case will now be described. In this case, the facet section is a 1-dimensional convex set. It must therefore be a line segment. Accordingly, a solution can be obtained by determining the corresponding closed interval in the 1-dimensional $s_4$-space that would give this intersection via the parametrization $\hat{x}=q_0+C\hat{s}$. In the present case, the above inequalities simplify to:

$$v_{14}s_4 + k_1 \geq 0$$
$$\vdots$$
$$v_{44}s_4 + k_4 \geq 0$$
$$s_4 \sum_{i=1}^{4} v_{i4} + k_0 \leq 1$$

Each of these inequalities can be cast into the form $\alpha s_4 + \beta \geq 0$, so that each either gives a lower bound $s_4 > -\beta/\alpha$ if $\alpha > 0$ or an upper bound $s_4 \leq -\beta/\alpha$ if $\alpha < 0$. If $\alpha=0$, then the inequality is impossible if $\beta < 0$, i.e., the intersection is empty. In general, the collection of all upper/lower bounds either gives an impossible set of inequalities, leading to the conclusion that the intersection is empty, or gives a finite closed interval in $s_4$-space.

Figure 6:
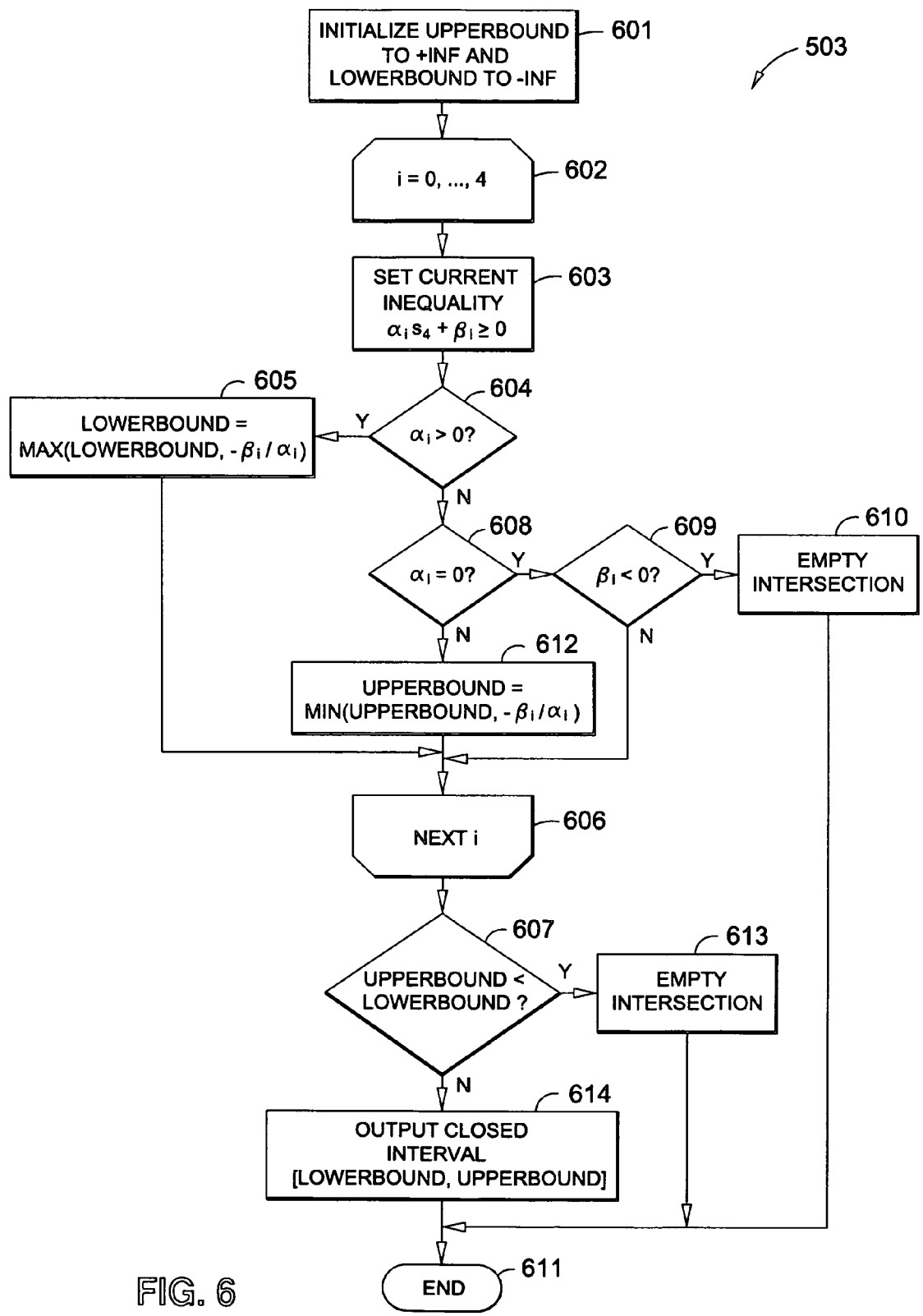
FIG. 6 is a process flowchart showing more detail of a method of facet sectioning according to one example embodiment of the present invention.

FIG. 6 is a more detailed flowchart showing the processes performed in one example embodiment of sectioning 503. An upper bound is initialized to +INF and a lower bound to −INF (601). +INF and −INF are system specific parameters. For example, in the IEEE double precision floating point system, ±INF are approximately ±1.7976931348623157×10$^{308}$. An iteration index i is set (602) to run from zero to 4. The current inequality is set (603) as: $\alpha_i s_4 + \beta_i \geq 0$. The process determines (604) whether $\alpha_i > 0$. If $\alpha_i > 0$, then the lower bound is set (605) equal to the maximum of the lower bound and $-\beta_i/\alpha_i$, and the iteration is advanced (606) by incrementing the iteration step i and returning to 603 (if the current i<4), or the process proceeds to 607 (if the current i=4).

At 604, if $\alpha_i \leq 0$ then the process determines (608) whether $\alpha_i = 0$. If $\alpha_i = 0$. then the process determines (609) whether $\beta_i < 0$. If $\beta_i < 0$ then the intersection is determined (610) as empty, and the process ends (611).

At 609, if $\beta_i \geq 0$ then the process is iterated (606). At 608, if $\alpha_i < 0$ then the upper bound is set (612) equal to the minimum of the upper bound and $-\beta_i/\alpha_i$, and the process is iterated (606).

At 607, the upper bound is compared to the lower bound. If the upper bound is less than the lower bound, then the intersection is determined (613) as empty, and the process ends (611). If the upper bound is not less than the lower bound at 607, then the values of the upper bound and the lower bound are output (614), and the process ends (611).

If the process determines that the intersection is non-empty, and the output at 614 is $[s_4^{min}, s_4^{max}]$, the closest point of this line segment from a given point p in the 5-dimensional ICS can be determined by computing the closest point of this line segment from $\hat{p}$ in the 2-dimensional $\hat{x}$-space using known techniques. For example, if $q_1 = q_0 + Cs_4^{min}, q_2 = q_0 + Cs_{4max}$, then the closest point on the line segment is given by:

$$q = q_1 + \lambda^*(q_2 - q_1)$$

where $$\lambda^* = \max\left(0, \min\left(1, \frac{(\hat{p} - q_1) \cdot (q_2 - q_1)}{(q_2 - q_1) \cdot (q_2 - q_1)}\right)\right).$$

Finally, it is noted that in this simple case, determination of the pseudo-inverse $C^+$ is not necessary, rather, it implicitly appears in the above closed form solution.

The n=6 (m=5) case will now be described. In this case, the facet section is a 2-dimensional convex set. Through the parametrization $\hat{x}=q_0+C\hat{s}$, there is a corresponding convex set in the 2-dimensional $(s_4, s_5)$-space defined by the following six inequalities:

$$v_{14}s_4 + v_{15}s_5 + k_1 \geq 0$$
$$\vdots$$
$$v_{54}s_4 + v_{55}s_5 + k_5 \geq 0$$
$$s_4 \sum_{i=1}^{5} v_{i4} + s_5 \sum_{i=1}^{5} v_{i5} + k_0 \leq 1$$

Again, each inequality is of the form $\alpha_i s_4 + \beta_i s_5 + \gamma_i \geq 0$, i=0, 1, . . . ,5. To compute the closest point of facet section from a given point p in the 6-dimensional ICS, we first project p to $\hat{p}$ in the 3-dimensional $\hat{x}$-space, then project $\hat{p}$ to the 2-dimensional facet section within the $\hat{x}$-space. The projection of $\hat{p}$ onto the 2-dimensional affine subspace containing the facet section is given by:

$$\hat{x} = C^+(\hat{p} - q_0)$$

The projection $\hat{s}=(s_4, s_5)$ is then tested against the six inequalities. If all the inequalities are satisfied, then the projection is also inside the facet section, and the closest point is therefore obtained. If at least one of the inequalities is not satisfied, then the closest point occurs on the boundary of the facet section. In this case, the vertices of the facet section need to be computed. In other words, we need to compute the intersection of the half planes defined by the inequalities.

One method of computing a half-plane intersection uses divide-and-conquer approach. However, that algorithm requires a point in the intersection to start. In other words, a separate algorithm, such as a linear program solver, is required to find a solution first, if there is any. In the present example case, there is no a priori knowledge of such a solution, or the knowledge that one exists. On the other hand, it involves only six half-planes/inequalities and the intersection is known to be bounded. In this case, one example method using a direct (not divide-and-conquer) approach that includes determining if the intersection is empty or not, and if not, computing the vertices, all at the same time, will now be described.

An initial bounding box in $(s_4, s_5)$-space can be obtained from the relationship $s=V^T t$. The unit vectors in t-space span the facet by construction, and when they are transformed into the s-space and projected onto the $(s_4, s_5)$-subspace, they determine a bounding box. In other words, the bounding box can be taken as:

$$s_4^{min} \leq s_4 \leq s_4^{max}$$

$$s_5^{min} \leq s_5 \leq s_5^{max}$$

where $$s_4^{min} = \min_{j=1,\ldots,5} V_{j4}$$

$$s_4^{max} = \max_{j=1,\ldots,5} V_{j4}$$

$$s_5^{min} = \min_{j=1,\ldots,5} V_{j5}$$

$$s_5^{max} = \max_{j=1,\ldots,5} V_{j5}$$

Figure 7:
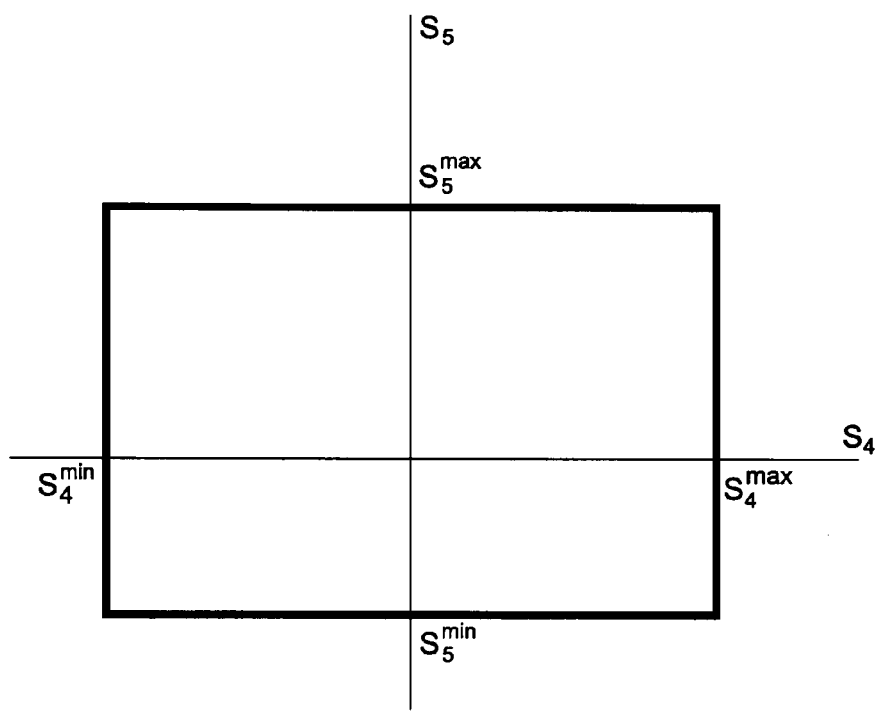
FIG. 7 is a representational diagram of an initial bounding box according to one example embodiment of the present invention.

An example initial bounding box is shown in FIG. 7. This initial bounding box is successively intersected by a half-plane defined by the inequality $\alpha_i s_4 + \beta_i s_5 + \gamma_i \geq 0$.

Figures 8, 8A:
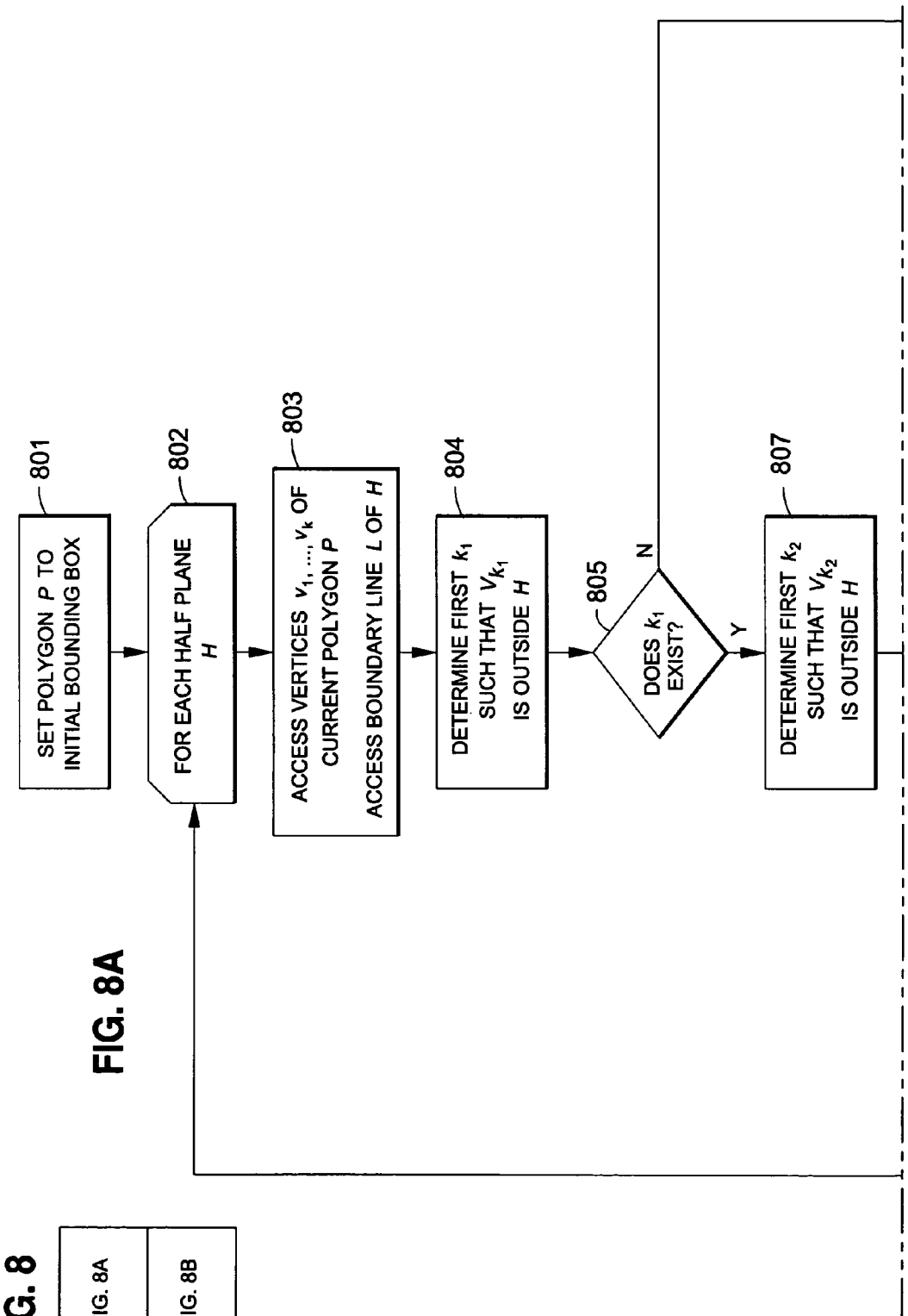
FIG. 8 is a process flowchart of a method of determining a half-plane intersection according to one example embodiment of the present invention.
Figure 8B:
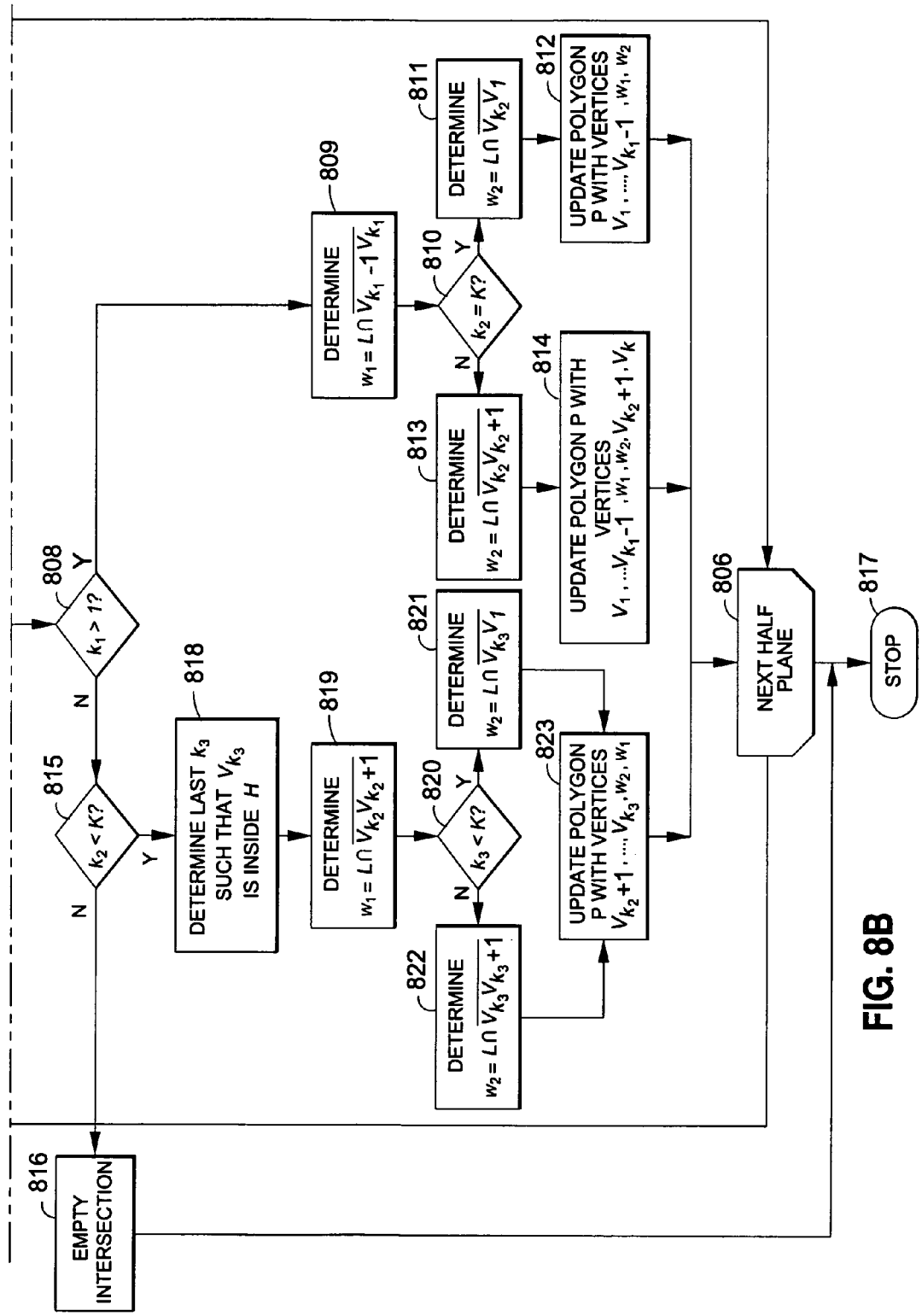

FIG. 8 shows one method of determining a half-plane intersection according to one example embodiment of the present invention. In this example case, the polygon to be intersected at a certain point has K vertices $v_1, \ldots, v_K$.

The polygon P is set (801) to the initial bounding box, such as the one described above, and a half plane H is selected (802). The vertices $v_1, \ldots, v_K$ of the current polygon P, and a boundary line L of H, are accessed (803). A first index $k_1$ is determined (804) such that $v_{k_1}$ is outside of H.

If (805) first index $k_1$ does not exist, then the whole polygon is inside the half-plane. In other words, intersection of the polygon with the half-plane is the polygon itself. The next half-plane (806) is then accessed, and the process is iterated (802) using the next half-plane. If $k_1$ exists, then the last index $k_2$ is determined (807) such that $v_{k_1}$ is outside of H. The value of $k_1$ is compared (808) to 1. If $k_1 > 1$, then a first new vertex $$w_1 = L \cap \overline{v_{k_1-1} v_{k_1}}$$

is determined (809). The value of $k_2$ is now compared (810) to K. If $k_2$ is equal to K, then a second new vertex $$w_2 = L \cap \overline{v_{k_2} v_1}$$

is determined (811), polygon P is updated (812) with vertices $v_1, \ldots, v_{k_1-1}, w_1, w_2$, and the process proceeds to 806. On the other hand, if $k_2$ is less than K at 810, then a second new vertex $$w_2 = L \cap \overline{w_{k_2} v_{k_2+1}}$$

is determined (813), polygon P is updated (814) with vertices $v_1, \ldots, v_{k_1-1}, w_1, w_2, v_{k_2+1}, v_K$, and the process proceeds to 806.

Referring again to 808, if $k_1$ is equal to 1, the value of $k_2$ is compared (815) to K. If $k_2$ is equal to K, then every vertex is outside of H. The intersection is determined (816) to be empty, and the process ends (817). On the other hand, if $k_2$ is less than K, then the last index $k_3$ is determined (818) such that $V_{k_3}$ is inside of H, and a first new vertex $$w_1 = L \cap \overline{v_{k_2} v_{k_2+1}}$$

is determined (819). Next, $k_3$ is compared (820) to K. If $k_3$ is equal to K, then a second new vertex $$w_2 = L \cap \overline{v_{k_3} v_1}$$

is determined (821), and the process proceeds to 823. On the other hand, if $k_3$ is less than K, then a second new vertex $$w_2 = L \cap \overline{v_{k_3} v_{k_3+1}}$$

is determined (822), and the process proceeds to 823.

At 823, polygon P is updated with vertices $v_{k_2+1}, \ldots, v_{k_3}$, $w_2, w_1$, and a next iteration is performed with a next half-plane (806). At 806, if there are no remaining half-planes, the process ends (817).

When the above process is iterated through all six inequalities, the result is either at the intersection is empty, or an ordered list of vertices that lie on the boundary of the facet section. In the latter case, the closest point to $\hat{p}$ is the closest point on a line segment connecting two consecutive vertices.

Figure 9:
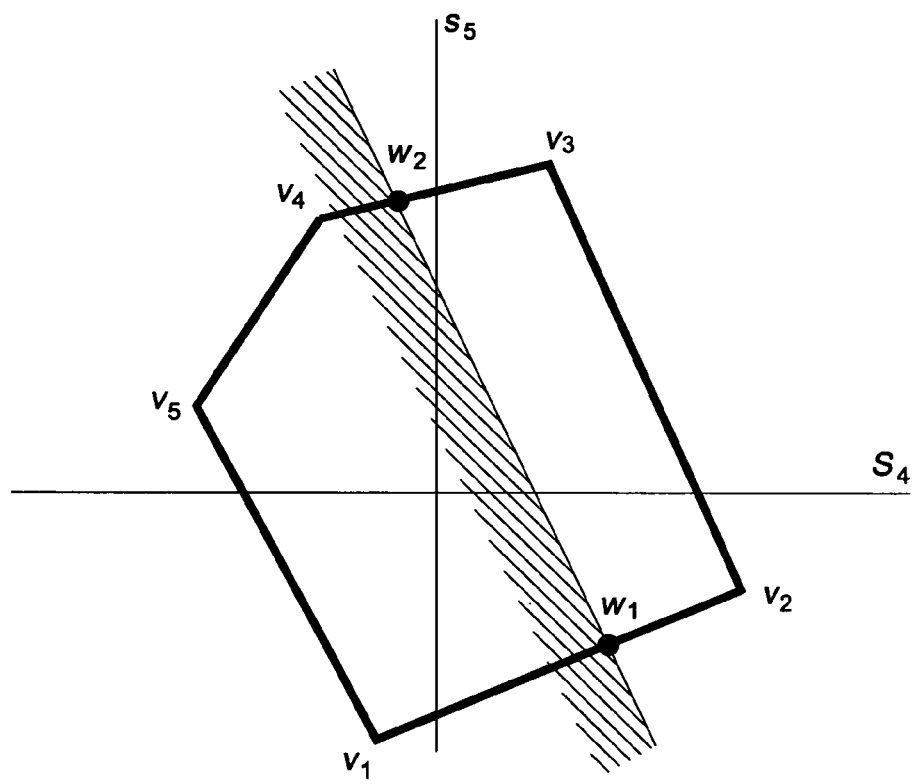
FIG. 9 is a representational diagram of an example iteration step.

FIG. 9 illustrates an example iteration step in the construction of the facet section.

Constrained ICS

One example construction of a constrained ICS will now be described with reference to a full-rank linear transformation $\Gamma: S \rightarrow X$ from the full spectral space S to a color space X and an ICS W that does not already possess the additional properties of a constrained ICS.

Figure 10:
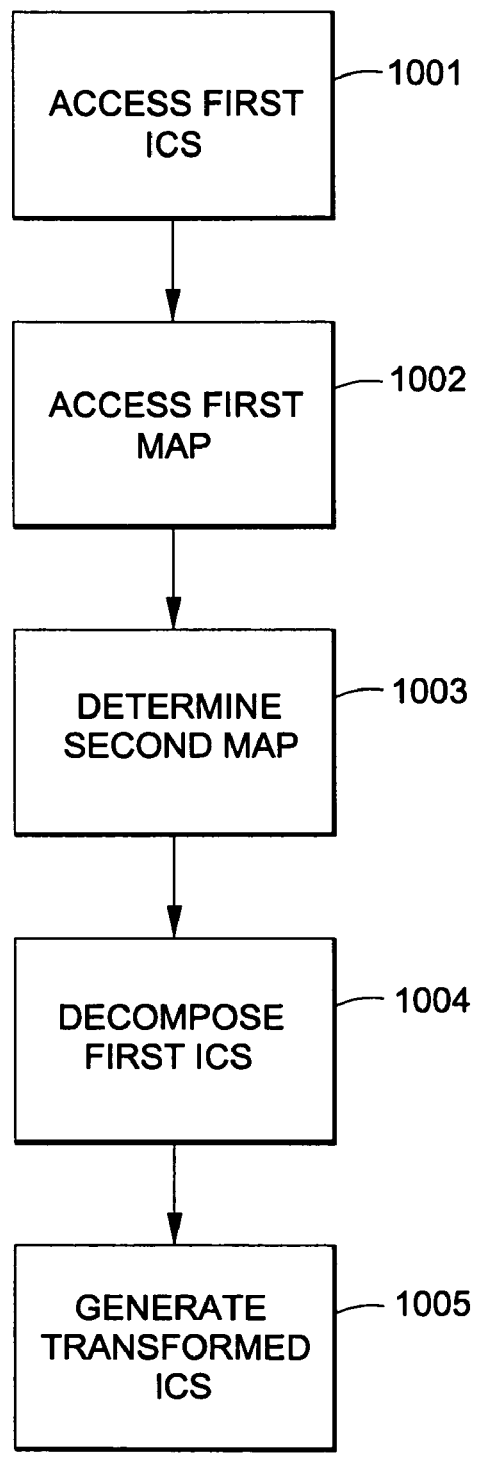
FIG. 10 is a process flowchart of an example method of constructing a constrained Interim Connection Space (ICS).

Referring now to FIG. 10, an n-dimensional ICS W in an N-dimensional full spectral space S is accessed (1001). The ICS W includes associated linear transformations to and from the full spectral space S:

$$P: S \rightarrow W$$

$$Q: W \rightarrow S$$

A "constraining" linear map $\Gamma$ is accessed (1002). The linear map $\Gamma: S \rightarrow X$ goes from S to a k-dimensional space X. The rank of $\Gamma$ is k in this example embodiment. For example, X can be the 3-dimensional CIEXYZ space, and $\Gamma$ can be the operation of spectral integration of the spectral reflectance with the SPD of a chosen illuminant.

From the sequence of linear transformations, $$W \xrightarrow{Q} S \xrightarrow{\Gamma} X,$$

an overall linear transformation from W to X, which is represented as a k×n matrix, $M_\Gamma$, is determined (1003). W is decomposed (1004) into a direct sum of two orthogonal subspaces: a subspace C of "constrained variables"; and a subspace B of "free variables". Because the rank of $\Gamma$ is k, which is also the dimension of X in this example embodiment, then the dimension of C is also k, and the dimension of B is n–k. The null space of matrix $M_\Gamma$ is the subspace B. In other words, $$B = \{p \in W | M_\Gamma p = 0\}$$

Subspace C is the orthogonal complement of B in W. Note that the determination of C depends on the inner product on W, whereas the determination of B does not.

One example method of decomposing W into subspace B and subspace C includes performing an orthogonal transformation on space W, i.e., change of coordinates. An orthogonal transformation can be obtained, for example, using eigenvalue analysis, such as SVD. Under the transformed coordinate system, the projections onto B and C are projections onto the coordinate planes of the transformed space, denoted CW.

In the present example embodiment, the orthogonal transformation on W is performed through SVD on the matrix $M_\Gamma$. Namely:

$$M_\Gamma = U_\Gamma D_\Gamma V_\Gamma^T$$

where $U_\Gamma$ and $V_\Gamma$ are k×k, resp. n×n orthogonal matrices, and $D_\Gamma$ is an k×n "diagonal" matrix of singular values sorted in non-increasing order and is of the form:

$$D_\Gamma = (\tilde{D}_\Gamma : 0)$$

where $\tilde{D}_\Gamma$ is a k×k diagonal matrix.

Subspace B and subspace C are used to generate (1005) a constrained ICS CW. In particular, $V_\Gamma^T$ is the desired orthogonal transformation for space W, because under this coordinate transformation, $$\begin{pmatrix} c_1 \\ \vdots \\ c_k \\ b_1 \\ \vdots \\ b_{n-k} \end{pmatrix} = V^T_\Gamma \begin{pmatrix} p_1 \\ \vdots \\ p_n \end{pmatrix},$$

so that $M_\Gamma P = U_\Gamma \tilde{D}_\Gamma (c_1 \ldots c_k)^T$. in other words, only the first k coordinates are used to determine the output of $M_\Gamma$, and they provide the coordinates for the subspace C, whereas $b_1, \ldots, b_{n-k}$ provide coordinates for the subspace B.

This example construction of a constrained ICS, CW, results in the following equations that give the transformations going to and from S and X.

From S to CW: $x \mapsto V_\Gamma^T Px = c \oplus b$

From CW to S: $c \oplus b \mapsto V_\Gamma (c \oplus b)$

The subspace C can be identified with X because they are related by a non-singular linear transformation, i.e., a non-singular square matrix of dimension k.

C→X $c \mapsto U_\Gamma \tilde{D}_\Gamma c$

Since Γ is assumed to have full rank, the singular values in $\tilde{D}_\Gamma$ are all non-zero, so that it is invertible.

X→C $\xi \mapsto \tilde{D}_\Gamma^{-1} U_\Gamma^T \xi$

Figure 11:
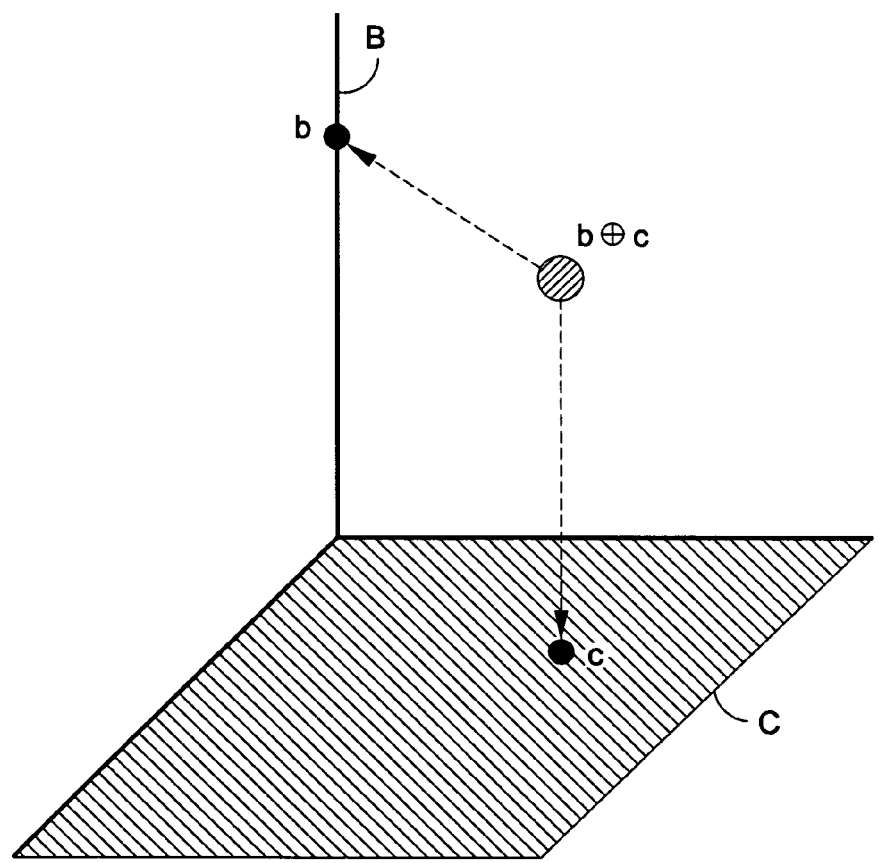
FIG. 11 is a representational diagram of an example geometry of a constrained ICs.

FIG. 11 is a graph of an example geometry of a constrained ICS. The example geometry is primarily for illustrative purposes, and shows a two-dimensional C subspace and a one-dimensional B subspace. The notation $c \oplus b$ is used to denote a point in the ICS that has coordinates c and b respectively in the C and B subspace.

Although the invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A computer-implemented method for gamut mapping of source color data in an Interim Connection Space into a destination gamut wherein the Interim Connection Space comprises (1) a first subspace that is a null space of a first transformation comprising a transformation from the Interim Connection Space to a first color space based on a first illuminant, and (2) a second subspace that is an orthogonal complement of the first subspace, the method comprising:

using a computer to access the source color data in the Interim Connection Space, the source color data including first color data in the first subspace and second color data in the second subspace;

using the computer to access spectral gamut boundary data of the destination gamut in the Interim Connection Space;

using the computer to map the second color data into a colorimetric gamut of the destination gamut, based on the spectral gamut boundary data; and using the computer to map the first color data into a spectral gamut at the mapped second color data based on the spectral gamut boundary data, while fixing the mapped second color data, by using minimization of an objective function based on a color difference calculated under a plurality of illuminants.

2. The method of claim 1, wherein the objective function is based on a color difference between two color values in the Interim Connection Space under the other illuminant, the two color values corresponding to the source color data in the Interim Connection Space and a color value in the Interim Connection Space with the fixed coordinates of the second subspace, respectively.

3. The method of claim 2, wherein the objective function is based on a sum of color differences, each color difference corresponding to one of a plurality of illuminants other than the first illuminant.

4. The method of claim 1, wherein the objective function is based on a color inconstancy index, with respect to the first illuminant, of the source color data under the other illuminant.

5. The method of claim 4, wherein the objective function is based on a sum of color inconstancy indices, each color inconstancy index corresponding to one of a plurality of illuminants other than the first illuminant.

6. The method of claim 1, wherein the spectral gamut is characterized by a convex hull, and mapping the source color data includes:

determining a gamut section of the spectral gamut at the fixed coordinates of the second subspace, wherein the result of the mapping is constrained to within the gamut section.

7. A computer-implemented method of constructing a computer-readable look-up table (LUT), the method comprising:

using a computer to gamut-map according to the method of claim 1, each of a plurality of source color data to obtain a corresponding plurality of gamut-mapped data; and storing, in a storage medium retrievably readable by the computer, the source color data and corresponding gamut-mapped data as a computer-readable LUT.

8. A color management module comprising:

a LUT constructed according to the method of claim 7, stored on the storage medium.

9. A device driver for a multi-channel printer comprising:

a gamut-mapping module constructed to implement gamut mapping according to the method of claim 1, for gamut-mapping of source color data to obtain corresponding gamut-mapped data; and a conversion module constructed to convert gamut-mapped data to multi-channel color data and to store the multi-channel color data in a computer-readable storage medium.

10. A device driver for a multi-channel printer comprising:

a LUT constructed according to the method of claim 9 stored on the storage medium.

11. The method of claim 1, wherein the objective function is based on an illuminant other than the first illuminant.

12. Computer-executable instructions retrievably stored on a non-transitory computer-readable medium, the computer-executable instructions executable to perform gamut mapping of source color data in an Interim Connection Space into a destination gamut, wherein the Interim Connection Space comprises (1) a first subspace that is a null space of a first transformation comprising a transformation from the Interim Connection Space to a first color space based on a first illuminant, and (2) a second subspace that is an orthogonal complement of the first subspace, said computer-executable instructions comprising process steps executable to perform a method according to any of claims 1 and 2 to 7.

13. An apparatus that performs gamut mapping of source color data in an Interim Connection Space into a destination gamut, wherein the Interim Connection Space comprises (1) a first subspace that is a null space of a first transformation comprising a transformation from the Interim Connection Space to a first color space based on a first illuminant, and (2) a second subspace that is an orthogonal complement of the first subspace, the apparatus comprising:
- a computer-readable storage medium that retrievably stores process steps executable to perform a method according to any of claims 1 and 2 to 7; and
- a processor coupled to the storage medium that executes the process steps stored in said storage medium.

14. An apparatus for gamut mapping of source color data in an Interim Connection Space into a destination gamut wherein the Interim Connection Space comprises (1) a first subspace that is a null space of a first transformation comprising a transformation from the Interim Connection Space to a first color space based on a first illuminant, and (2) a second subspace that is an orthogonal complement of the first subspace, the apparatus comprising:
- an accessing unit constructed to access the source color data in the Interim Connection Space, the source color data including first color data in the first subspace and second color data in the second subspace, and to access a spectral gamut boundary data of the destination gamut in the Interim Connection Space; and
- a mapping unit constructed to map the second color data into a colorimetric gamut of the destination gamut, based on the spectral gamut boundary data;
- wherein the mapping unit is further constructed to map the first color data into a spectral gamut at the mapped second color data based on the spectral gamut boundary data, while fixing the mapped second color data, by using a minimization of an objective function based on a color difference calculated under a plurality of illuminants.

15. The apparatus of claim 14, wherein the objective function is based on a color difference between two color values in the Interim Connection Space under the other illuminant, the two color values corresponding to the source color data in the Interim Connection Space and a color value in the Interim Connection Space with the fixed coordinates of the second subspace, respectively.

16. The apparatus of claim 15, wherein the objective function is based on a sum of color differences, each color difference corresponding to one of a plurality of illuminants other than the first illuminant.

17. The apparatus of claim 14, wherein the objective function is based on a color inconstancy index, with respect to the first illuminant, of the source color data under the other illuminant.

18. The apparatus of claim 17, wherein the objective function is based on a sum of color inconstancy indices, each color inconstancy index corresponding to one of a plurality of illuminants other than the first illuminant.

19. The apparatus of claim 14, wherein the spectral gamut is characterized by a convex hull, and the mapping of the source color data performed by the mapping unit includes:
- determining a gamut section of the spectral gamut at the fixed coordinates of the second subspace, wherein the result of the mapping is constrained to within the gamut section.

20. The apparatus of claim 14, wherein the objective function is based on an illuminant other than the first illuminant.

* * * * *